United States Patent
Shimomura

(10) Patent No.: US 9,329,372 B2
(45) Date of Patent: May 3, 2016

(54) ZOOM LENS AND IMAGE PICKUP APPARATUS HAVING THE SAME

(71) Applicant: CANON KABUSHIKI KAISHA, Tokyo (JP)

(72) Inventor: Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 14/452,615

(22) Filed: Aug. 6, 2014

(65) Prior Publication Data

US 2015/0042846 A1 Feb. 12, 2015

(30) Foreign Application Priority Data

Aug. 8, 2013 (JP) .................................. 2013-164807

(51) Int. Cl.
| | |
|---|---|
| *G02B 15/14* | (2006.01) |
| *G02B 15/20* | (2006.01) |
| *G02B 13/00* | (2006.01) |
| *G02B 15/177* | (2006.01) |

(52) U.S. Cl.
CPC .............. *G02B 15/20* (2013.01); *G02B 13/002* (2013.01); *G02B 13/009* (2013.01); *G02B 15/177* (2013.01)

(58) Field of Classification Search
CPC .... G02B 15/20; G02B 13/009; G02B 13/002; G02B 15/177
USPC ................................................. 359/686–688
See application file for complete search history.

(56) References Cited

U.S. PATENT DOCUMENTS

| | | | | |
|---|---|---|---|---|
| 2012/0044576 A1* | 2/2012 | Okumura | ............. | G02B 15/173 359/686 |
| 2013/0271850 A1* | 10/2013 | Shimomura | ......... | G02B 15/173 359/687 |

FOREIGN PATENT DOCUMENTS

| | | |
|---|---|---|
| JP | S63281113 A | 11/1988 |
| JP | H04051006 A | 2/1992 |
| JP | H05297276 A | 11/1993 |

* cited by examiner

*Primary Examiner* — Bumsuk Won
*Assistant Examiner* — Tamara Y Washington
(74) *Attorney, Agent, or Firm* — Carter, DeLuca, Farrell & Schmidt, LLP

(57) ABSTRACT

A zoom lens includes, in order from an object side: a negative first lens unit which does not move for zooming; a positive second lens unit which moves during the zooming; a negative third lens unit which moves during the zooming; and a positive fourth lens unit, wherein the following expressions are satisfied:

$$-0.80 < f1/f2 < -0.25,$$

$$-1.2 < f2/f3 < -0.4, \text{ and}$$

$$0.5 < |m2/m3| < 3.0,$$

where f1 represents a focal length of the first lens unit, f2 represents a focal length of the second lens unit, f3 represents a focal length of the third lens unit, m2 represents a moving amount of the second lens unit during the zooming from a wide angle end to a telephoto end, and m3 represents a moving amount of the third lens unit during the zooming from the wide angle end to the telephoto end.

8 Claims, 15 Drawing Sheets

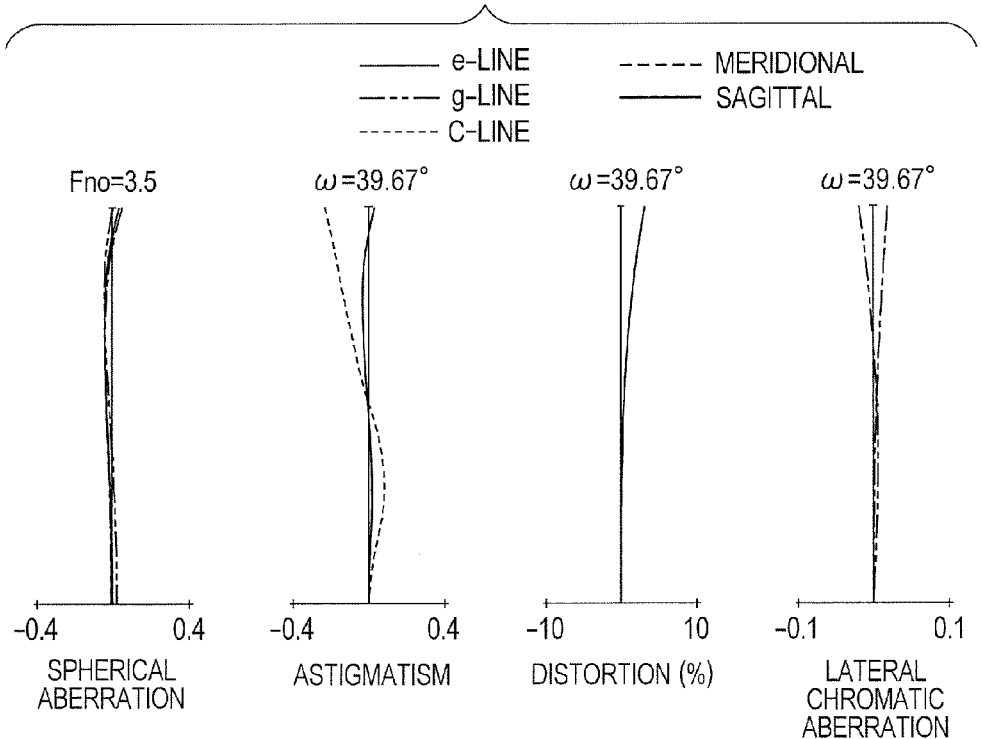
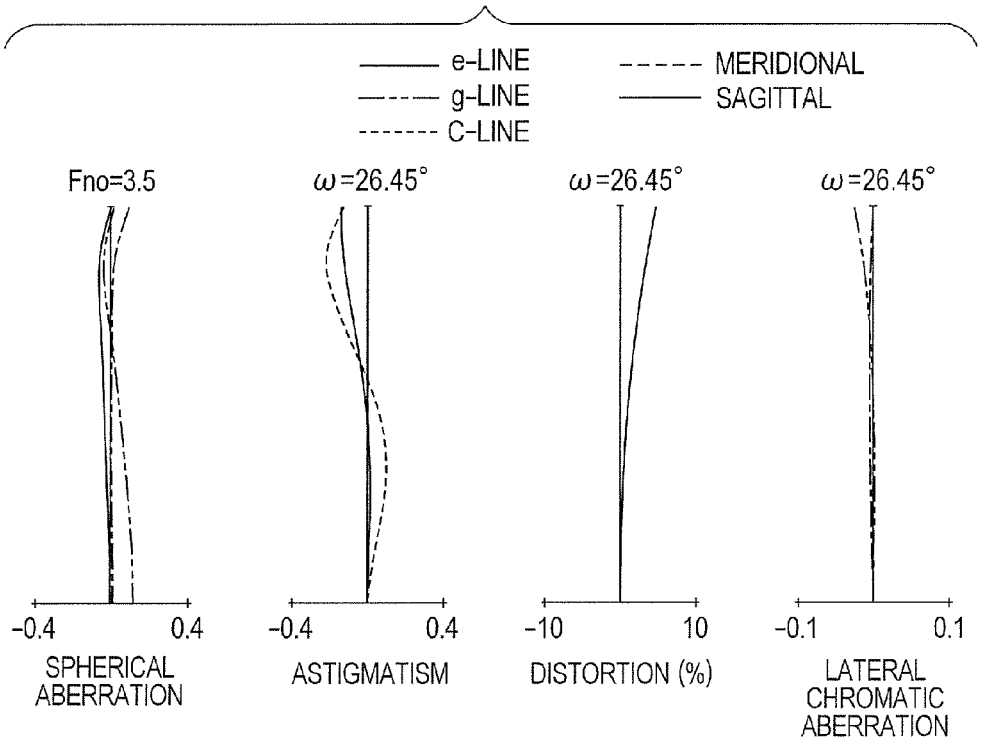

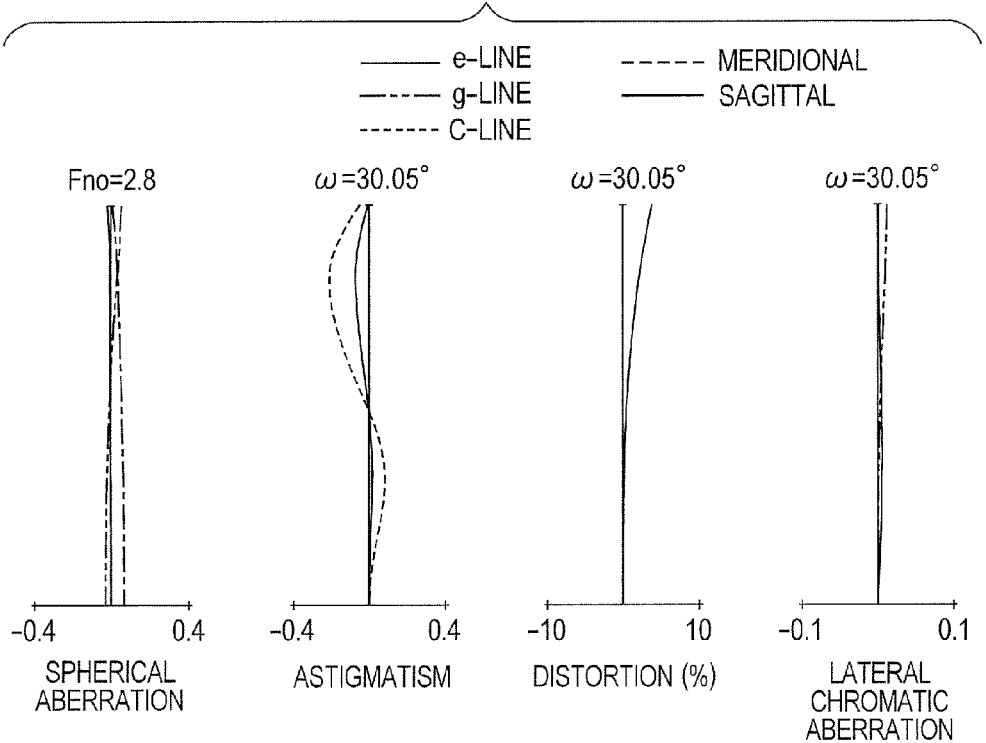
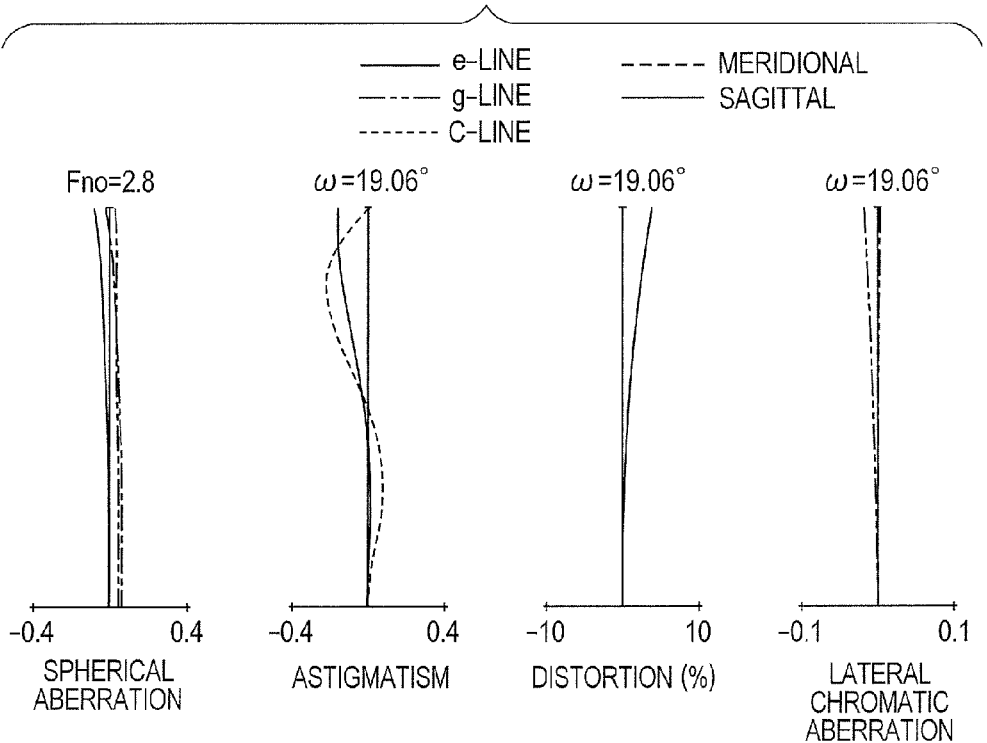

ZOOM LENS AND IMAGE PICKUP APPARATUS HAVING THE SAME

BACKGROUND OF THE INVENTION

1. Field of the Invention

The present invention relates to a zoom lens, and an image pickup apparatus having the same, and particularly relates to a zoom lens which is suitable for a broadcasting television camera, a cinema camera, a video camera, a digital still camera, a silver-halide film camera and the like.

2. Description of the Related Art

In recent years, an image pickup apparatus such as a television camera, a cinema camera, a photographic camera and a video camera has been desired to be provided with a zoom lens which has a reduced size and weight, a wide angle of view and a high optical performance. An image pickup device such as CCD or CMOS which is used in a television/cinema camera as a moving image photographing system for professionals, in particular, has an almost even resolving power over the whole imaging range. Owing to this, the zoom lens to be used with such a device is required to have an almost even resolving power from the center of a screen to the periphery of the screen. In addition, reduction in size and weight is also required for a photographic style in which mobility and operability are regarded as important.

On the other hand, a wide angle lens having a short focal length at a wide angle end allows for photography over a wide range and enhanced perspective. Users who desire to use the photographic effect strongly demand a zoom lens that has a wider angle of view, a further reduced size and weight and a higher optical performance.

A negative-lead type of four-unit zoom lens is known as a wide-angle zoom lens, which has a lens unit having a negative refractive power arranged on the side closest to the object, and includes four lens units as a whole.

For instance, Japanese Patent Application Laid-Open No. H05-297276 discloses a four-unit zoom lens which has an F-number of approximately 2.0 at a wide angle end, an angle of view of approximately 60 degrees to 65 degrees at a wide angle end, an angle of view of approximately 14 degrees to 17 degrees at a telephoto end, and a zoom ratio of approximately 3.8. In addition, Japanese Patent Application Laid-Open No. H04-051006 discloses a four-unit zoom lens which has an F-number of approximately 1.5 to 2.2 at a wide angle end, an angle of view of approximately 50 degrees to 60 degrees at a wide angle end, an angle of view of approximately 8 degrees to 11 degrees at a telephoto end, and a zoom ratio of approximately 6. Japanese Patent Application Laid-Open No. S63-281113 discloses a four-unit zoom lens which has an F-number of approximately 1.8 at a wide angle end, an angle of view of approximately 80 degrees at a wide angle end, an angle of view of approximately 24 degrees at a telephoto end, and a zoom ratio of approximately 3.9. Any zoom lens includes, in order from the object side to the image side: a first lens unit having a negative refractive power; a second lens unit having a positive refractive power; a third lens unit having a negative refractive power; and a fourth lens unit having a positive refractive power.

However, in the zoom lenses which are disclosed in Japanese Patent Application Laid-Open No. H05-297276, Japanese Patent Application Laid-Open No. H04-051006 and Japanese Patent Application Laid-Open No. S63-281113, the refractive power and the lens configuration of each of the lens units are disadvantageous for further widening of the angle of view, and it becomes difficult to suppress the enlargement of a lens diameter resulting from the widening of the angle of view. When the angle of view at the wide angle end exceeds 80 degrees, in particular, the lens diameter tends to be remarkably enlarged.

SUMMARY OF THE INVENTION

An object of the present invention is to provide a zoom lens which has a wide angle of view, a reduced size and weight, and a high optical performance over a full zoom range, by appropriately setting the refractive power and the lens configuration of each lens unit, shares of aberration correction, and the like. Specifically, the object is to provide a zoom lens which has an angle of view of approximately 80 to 120 degrees at a wide angle end, an angle of view of approximately 25 degrees to 100 degrees at a telephoto end and a zoom ratio of approximately 1.5 to 4, and has a reduced size and weight and a high optical performance.

In order to achieve the above described objects, a zoom lens according to the present invention includes, in order from an object side to an image side: a first lens unit having a negative refractive power which does not move for zooming; a second lens unit having a positive refractive power which moves during the zooming; a third lens unit having a negative refractive power which moves during the zooming; and a fourth lens unit having a positive refractive power, wherein the following expressions are satisfied:

$$-0.80 < f1/f2 < -0.25,$$

$$-1.2 < f2/f3 < -0.4, \text{ and}$$

$$0.5 < |m2/m3| < 3.0,$$

where f1 represents a focal length of the first lens unit, f2 represents a focal length of the second lens unit, f3 represents a focal length of the third lens unit, m2 represents a moving amount of the second lens unit during the zooming from a wide angle end to a telephoto end, and m3 represents a moving amount of the third lens unit during the zooming from the wide angle end to the telephoto end.

The zoom lens having the wide angle of view, the reduced size and weight and the high optical performance over the full zooming range is achieved by appropriately setting the refractive power and the lens configuration of each lens unit, the sharing of aberration correction, and the like.

Further features of the present invention will become apparent from the following description of exemplary embodiments with reference to the attached drawings.

BRIEF DESCRIPTION OF THE DRAWINGS

FIG. 2B illustrates views of aberration when the zoom lens is set at the middle of the zoom and focuses on infinity, in Numeric Embodiment 1.

FIG. 2C illustrates views of aberration when the zoom lens is set at a telephoto end and focuses on infinity, in Numeric Embodiment 1.

FIG. 4B illustrates views of aberration when the zoom lens is set at the middle of the zoom and focuses on infinity, in Numeric Embodiment 2.

FIG. 4C illustrates views of aberration when the zoom lens is set at a telephoto end and focuses on infinity, in Numeric Embodiment 2.

DESCRIPTION OF THE EMBODIMENTS

Preferred embodiments of the present invention will now be described in detail in accordance with the accompanying drawings.

Firstly, the features of the zoom lens according to the present invention will be described below with reference to each conditional expression. In order to achieve a wide angle of view, a reduced size and weight, and a high optical performance over a full zooming range, the zoom lens according to the present invention specifies a ratio between focal lengths of a first lens unit and a second lens unit, a ratio between focal lengths of a second lens unit and a third lens unit, and a ratio between moving amounts of the second lens unit and the third lens unit when zooming from a wide angle end to a telephoto end. The moving amount is a difference between positions before and after the movement on an optical axis. When a lens unit is moved to a position closer to the image (telephoto end) than the position before the movement (wide angle end), the position after the movement is determined to be positive.

The zoom lens according to the present invention includes, in order from the object side to the image side: a first lens unit having a negative refractive power which does not move for zooming; a second lens unit having a positive refractive power which moves during zooming; a third lens unit having a negative refractive power which moves during zooming; and a fourth lens unit having a positive refractive power. Furthermore, when the focal length of the first lens unit is represented by f1, the focal length of the second lens unit is represented by f2, the focal length of the third lens unit is represented by f3, the moving amount of the second lens unit during zooming from a wide angle end to a telephoto end is represented by m2 and the moving amount of the third lens unit during zooming is represented by m3, the f1, the f2, the f3, the m2 and the m3 satisfy the expressions of:

$$-0.80 < f1/f2 < -0.25 \quad (1)$$

$$-1.2 < f2/f3 < -0.4 \quad (2)$$

$$0.5 < |m2/m3| < 3.0 \quad (3).$$

An optical function of the zoom lens in the present invention will be described below, which includes: a first lens unit having a negative refractive power which does not move for zooming; a second lens unit having a positive refractive power which moves during zooming; a third lens unit having a negative refractive power which moves during zooming; and a fourth lens unit having a positive refractive power.

Figure 13A:
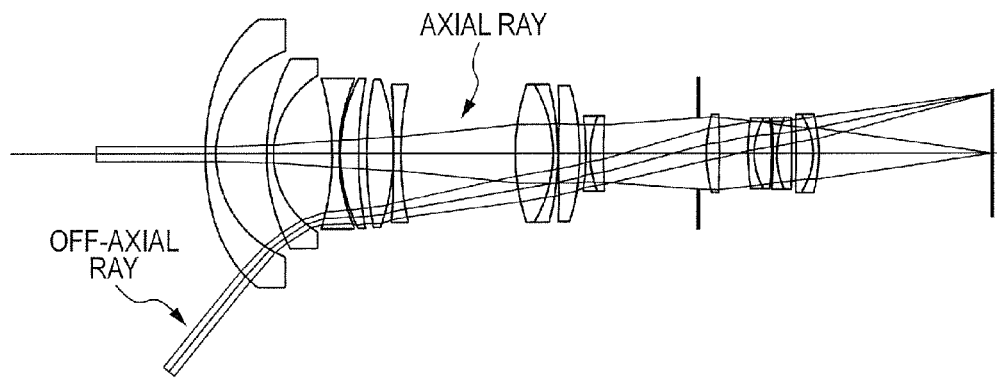
FIG. 13A illustrates a view of a light path when the zoom lens is set at the wide angle end, in Numeric Embodiment 1.
Figure 13B:
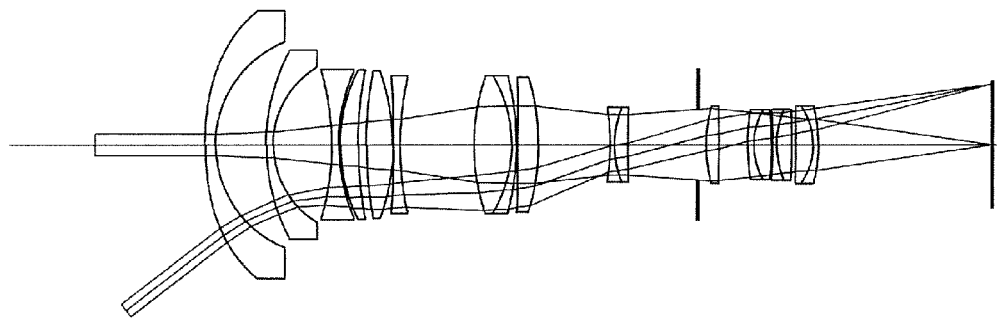
FIG. 13B is a view of a light path when the zoom lens is set at the middle of the zoom, in Numeric Embodiment 1.
Figure 13C:
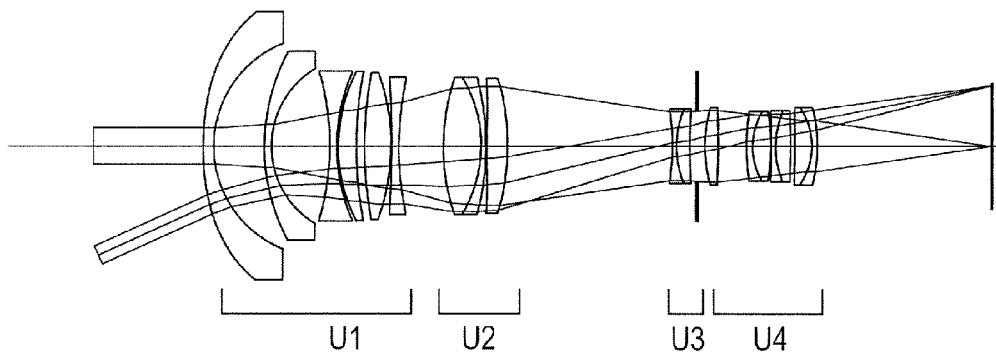
FIG. 13C is a view of a light path when the zoom lens is set at the telephoto end, in Numeric Embodiment 1.

FIGS. 13A, 13B and 13C illustrate views of light paths when the zoom lens is set the wide angle end, the middle of the zoom and the telephoto end respectively, in Exemplary Embodiment 1 according to the present invention. U1 to U4 represent the first lens unit to the fourth lens unit respectively. As is understood from in FIGS. 13A, 13B and 13C, in Exemplary Embodiment 1 according to the present invention, the first lens unit and the second lens unit form such trajectory that the first lens unit and the second lens unit are separated from each other in the wide angle end, and the first lens unit and the second lens unit become close to each other in the telephoto end. The zoom lens in Exemplary Embodiment 1 can arrange the first lens unit having the negative refractive power and the second lens unit having the positive refractive power so as to be separated from each other when having been set at the wide angle end, accordingly can reduce the absolute value of the lateral magnification of the second lens unit when having been set at the wide angle end, and can push the entrance pupil to the object side. Because of this, the zoom lens is configured so as to be advantageous for achieving both widening of an angle of view and a reduced size and weight. Furthermore, when the f1, the f2, the f3, the m2 and the m3 satisfy the previously described expressions (1) to (3), the zoom lens can effectively achieve a wide angle of view, a reduced size and weight, and a high optical performance over a full zooming range.

Expression (1) specifies a ratio between a focal length of the first lens unit and a focal length of the second lens unit. When the f1 and the f2 satisfy the Expression (1), the zoom lens achieves the widening of an angle of view and the correction of aberration variation at the same time. The focal length of the zoom lens becomes a value obtained by multiplying the focal length of the first lens unit by a lateral magnification of the second lens unit to the fourth lens unit, and accordingly, in order to achieve the widening of the angle of view, it is necessary to appropriately set the focal length of the first lens unit. If the condition of the upper limit of the Expression (1) is not satisfied, the refractive power of the first lens unit becomes strong, and it becomes difficult to correct the aberration variation due to zooming and the aberration variation due to focusing. If the condition of the lower limit of the Expression (1) is not satisfied, the first lens unit lacks in its refractive power, and accordingly it becomes difficult to widen the angle of view and reduce the size and weight at the same time. It is desirable that the Expression (1) can be set further in the following way:

$$-0.70 < f1/f2 < -0.35 \quad (1a).$$

In addition, Expression (2) specifies a ratio between a focal length of the second lens unit and a focal length of the third lens unit. When the f2 and the f3 satisfy the Expression (2), the zoom lens can efficiently achieve the reduction in the size and weight and a high optical performance. If the upper limit of the Expression (2) is not satisfied, the refractive power of the second lens unit becomes strong, and accordingly the aberration variation due to zooming, in particular, variations of spherical aberration and field curvature increase, and it becomes difficult to achieve an adequate optical performance in the whole zooming region. If the condition of the lower limit of the Expression (2) is not satisfied, the refractive power of the second lens unit becomes weak, and accordingly an image point (=object point of third lens unit) of the second lens unit is arranged in the image side. Because of this, the moving amount of the third lens unit due to zooming increases, and it becomes difficult to reduce the size and weight. It is desirable that the Expression (2) can be set further in the following way:

$$-1.1 < f2/f3 < -0.5 \quad (2a).$$

Expression (3) specifies a ratio between a moving amount of the second lens unit and a moving amount of the third lens unit when the zoom lens moves from a wide angle end to a telephoto end. When the m2 and the m3 satisfy the Expression (3), the zoom lens can achieve the reduction in the size and weight and a high optical performance at the same time. Here, pay attention to the height of the light beam of an on-axis light beam in the views of the light path in FIGS. 13A, 13B and 13C, and it is understood that the variation of the height of the light beam occurring when the second lens unit has moved from the wide angle end to the telephoto end is large compared to the variation in the third lens unit. Because of this, it is desirable for adequately correcting the aberration to reduce the moving amount of the second lens unit during zooming. If the upper limit of the Expression (3) is not satisfied, the moving amount of the second lens unit during zooming increases, and because of the above described reason, it becomes difficult to achieve the adequate optical performance in the whole zooming region. If the condition of the lower limit of Expression (3) is not satisfied, the moving amount of the third lens unit due to zooming increases, and it becomes difficult to reduce the size and weight. It is desirable that the Expression (3) can be set further in the following way.

$$0.65 < |m2/m3| < 2.70 \quad (3a)$$

Another aspect of the zoom lens according to the present invention specifies the configuration and the focusing of the first lens unit. The first lens unit includes a first sub lens unit having a negative refractive power which does not move for focusing, and a second sub lens unit which moves during focusing. When the focal length of the first sub lens unit is represented by f11, and the focal length of the second sub lens unit is represented by f12, the f11 and the f12 satisfy the expression of:

$$0.005 < |f11/f12| < 0.150 \quad (4).$$

Expression (4) is specified so as to suppress the moving amount of the second sub lens unit during focusing and achieve a high optical performance. If the condition of the upper limit of the Expression (4) is not satisfied, the refractive power of the first sub lens unit becomes weak, the moving amount of the second sub lens unit during focusing increases, which is disadvantageous for the reduction in the size and weight of the zoom lens. If the condition of the lower limit of the Expression (4) is not satisfied, the refractive power of the first sub lens unit becomes strong, and it becomes difficult to correct the aberration variation due to focusing. In addition, if the number of the lenses which constitute the first sub lens unit has been increased so as to achieve the adequate optical performance, it becomes difficult to reduce the size and weight of the zoom lens. It is desirable that the Expression (4) can be set further in the following way:

$$0.01 < |f11/f12| < 0.08 \quad (4a).$$

Another aspect of the zoom lens according to the present invention specifies that the zoom lens focuses with the fourth lens unit or a lens unit of a part of the fourth lens unit. It becomes advantageous for the followability during focusing and the downsizing of a driving mechanism to perform focusing with the fourth lens unit having a small lens diameter and a light weight or with the lens unit of a part of the fourth lens unit.

Another aspect of the zoom lens according to the present invention specifies the configuration of a front sub lens unit which does not move for the focusing out of the lenses that constitute the first lens unit. The front sub lens unit includes one or more convex lenses and two or more concave lenses, wherein a lens closest to the object in the front sub lens unit is a concave lens and a lens closest to the image in the front sub lens unit is a convex lens. When the front sub lens unit has a lens having a negative refractive power arranged on the side closest to the object in the front sub lens unit, and a lens having a positive refractive power arranged on the side closest to the image in the front sub lens unit, the first lens unit is configured so as to facilitate the image side principal point of the first lens unit to be set in the object side, and become advantageous for the widening of the angle of view.

Another aspect of the zoom lens according to the present invention specifies a partial dispersion ratio of the optical material which is used in the front sub lens unit. When the average values of the Abbe number and the partial dispersion ratio of the convex lenses which constitute the front sub lens unit are represented by ν1p and θ1p respectively, and the average values of the Abbe number and the partial dispersion ratio of the concave lenses which constitute the front sub lens unit are represented by ν1n and θ1n respectively, the ν1p, the θ1p, the ν1n and the θ1n satisfy the expression of:

$$-2.50\times10^{-3}<(\theta 1p-\theta 1n)/(\nu 1p-\nu 1n)<-1.30\times10^{-3} \quad (5).$$

Here, the Abbe number and the partial dispersion ratio of the material of the optical element (lens) which is used in the present invention are as follows. When the refractive indices in the g-line (435.8 nm), the F-line (486.1 nm), the d-line (587.6 nm) and the C-line (656.3 nm) of Fraunhofer lines shall be represented by Ng, NF, Nd and NC respectively, the Abbe number νd and the partial dispersion ratio θgF concerning the g-line and the F-line are as follows.

$$\nu d=(Nd-1)/(NF-NC) \quad (a)$$

$$\theta gF=(Ng-NF)/(NF-NC) \quad (b)$$

In existing optical materials, the partial dispersion ratio θgF exists in a narrow range of the Abbe number νd. In addition, the optical materials have such a tendency that as the Abbe number νd is smaller, the partial dispersion ratio θgF is larger, and as the Abbe number νd is larger, the refractive index is lower. Here, a correction condition for the chromatic aberration of a thin-wall close-contact system which is formed of two lenses 1 and 2 having refractive powers φ1 and φ2 and Abbe numbers ν1 and ν2 respectively, is expressed by:

$$\phi 1/\nu 1+\phi 2/\nu 2=E \quad (c).$$

Here, the combined refractive index φ of the lenses 1 and 2 is expressed by:

$$\phi=\phi 1+\phi 2 \quad (d).$$

In the Expression (c), if E=0 is satisfied, imaging positions of the C-line and the F-line coincide with each other in the chromatic aberration. At this time, φ1 and φ2 are expressed by the following expressions.

$$\phi 1=\phi\times\nu 1/(\nu 1-\nu 2) \quad (e)$$

$$\phi 2=\phi\times\nu 2/(\nu 1-\nu 2) \quad (f)$$

Figure 14:
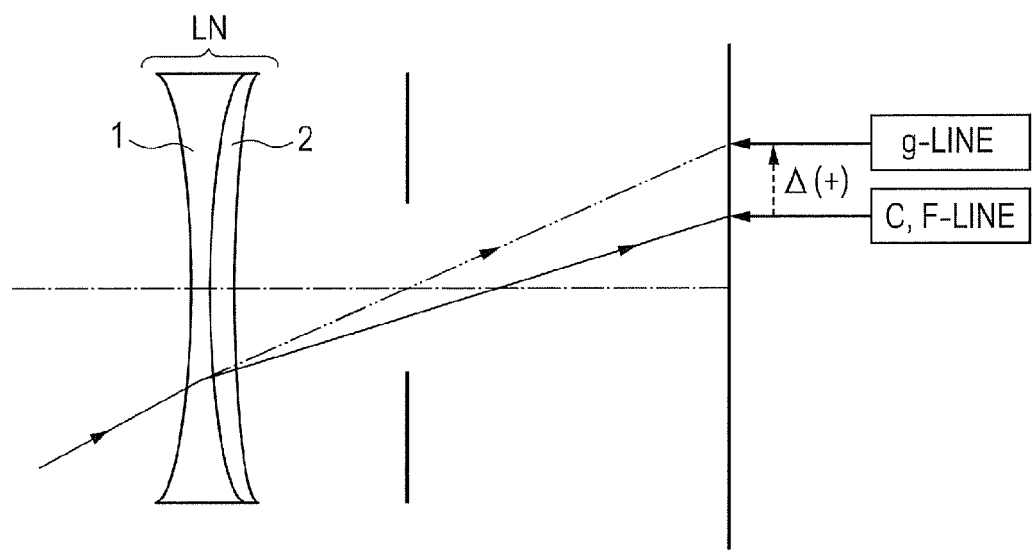
FIG. 14 illustrates a schematic view concerning chromatic aberration correction and residual secondary spectrum of two colors, in lateral chromatic aberration of a negative lens unit.

FIG. 14 is a schematic view concerning chromatic aberration correction and residual secondary spectrum of two colors, in lateral chromatic aberration due to a lens unit LN which exists in between an object surface and an aperture stop and has a negative refractive power. In the chromatic aberration correction of the negative lens unit LN in FIG. 14, a material having a large Abbe number ν1 is used for a negative lens 1, and a material having a small Abbe number ν2 is used for a positive lens 2. Accordingly, the negative lens 1 has a small partial dispersion ratio θ1, and the positive lens 2 has a large partial dispersion ratio θ2. When the lateral chromatic aberration is corrected in the C-line and the F-line, the imaging point of the g-line deviates toward a direction distant from the optical axis. When the amount of deviation of the lateral chromatic aberration of the g-line from that of the C-line and the F-line is defined as the amount ΔY of a secondary spectrum, ΔY is expressed by the expression of:

$$\Delta Y=(1/\phi)\times(\theta 1-\theta 2)/(\nu 1-\nu 2) \quad (g).$$

In order to adequately correct the secondary spectrum of the lateral chromatic aberration in the wide angle end, it is necessary to adjust the amount of the secondary spectrum to be generated in the front sub lens unit in which the secondary spectrum of the lateral chromatic aberration is remarkably generated. The front sub lens unit has a negative refractive power, and in order to adequately correct the secondary spectrum of the lateral chromatic aberration in the wide angle end, it is necessary to select such a glass material as to reduce the amount ΔY of the secondary spectrum which is generated in the front sub lens unit.

The condition of the Expression (5) is specified in order to achieve the correction of the lateral chromatic aberration in the wide angle end and a high optical performance. If the condition of the upper limit of Expression (5) is not satisfied, the result is advantageous for the correction of the secondary spectrum of the lateral chromatic aberration in the wide angle end. However, the refractive index of the concave lens which constitutes the front sub lens unit is lowered, and the radius of curvature of the concave lens which constitutes the front sub lens unit decreases. As a result, the high order aberration of the field curvature and the coma increases, and it becomes difficult to achieve the adequate optical performance. If the condition of the lower limit of the Expression (5) is not satisfied, the secondary spectrum of the lateral chromatic aberration in the wide angle end increases, and it becomes difficult to adequately correct the chromatic aberration in the wide angle end. It is desirable that the Expression (5) can be set further in the following way:

$$-2.35\times10^{-3}<(\theta 1p-\theta 1n)/(\nu 1p-\nu 1n)<-1.45\times10^{-3} \quad (5a).$$

Another aspect of the zoom lens according to the present invention specifies the configuration of the second lens unit and a partial dispersion ratio of an optical material which is used in the second lens unit. The second lens unit includes two or more convex lenses and one or more concave lenses, wherein when the average values of the Abbe number and the partial dispersion ratio of the convex lenses which constitute the second lens unit are represented by ν2p and θ2p respectively, and the average values of the Abbe number and the partial dispersion ratio of the concave lenses are represented by ν2n and θ2n respectively, the ν2p, the θ2p, the ν2n and the θ2n satisfy the expression of:

$$-2.30\times10^{-3}<(\theta 2p-\theta 2n)/(\nu 2p-\nu 2n)<-1.20\times10^{-3} \quad (6).$$

Figure 15:
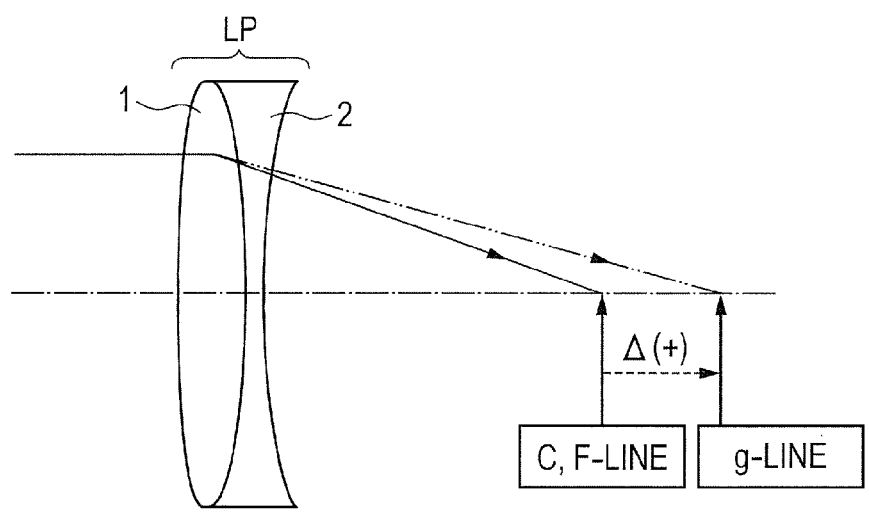
FIG. 15 illustrates a schematic view concerning chromatic aberration correction and residual secondary spectrum of two colors, in axial chromatic aberration of a positive lens unit.

FIG. 15 illustrates a schematic view concerning chromatic aberration correction and residual secondary spectrum of two colors, in axial chromatic aberration of a lens unit LP having a positive refractive power. In FIG. 15, a material having a large Abbe number ν1 is used for a positive lens 1, and a material having a small Abbe number ν2 is used for a negative lens 2. Accordingly, the partial dispersion ratio θ1 of the positive lens 1 becomes small, and the partial dispersion ratio θ2 of the negative lens 2 becomes large. Consequently, when the axial chromatic aberration has been corrected in the C-line and the F-line, the imaging point of the g-line deviates to the image side. In the case where a luminous flux has been incident on the lens system from the infinite object distance, when the amount of deviation of the axial chromatic aberration of the g-line from that of the C-line and the F-line is defined as the amount ΔS of the secondary spectrum, ΔS is expressed by:

$$\Delta S=-(1/\phi)\times(\theta 1-\theta 2)/(\nu 1-\nu 2) \quad (h).$$

In order to adequately correct the secondary spectrum of the axial chromatic aberration in the telephoto end, it is necessary to adjust the amount of the secondary spectrum to be generated in the second lens unit in which the secondary spectrum is remarkably generated. The second lens unit has a positive refractive power, and in order to adequately correct the secondary spectrum of the axial chromatic aberration in the telephoto end, it is necessary to select such a glass material as to reduce the amount ΔS of the secondary spectrum which is generated in the second lens unit.

The condition of the Expression (6) is specified in order to achieve the correction of the axial chromatic aberration in the telephoto end and a high optical performance. If the condition of the upper limit of the Expression (6) is not satisfied, the result is advantageous for the correction of the secondary spectrum of the axial chromatic aberration in the telephoto end. However, the refractive index of the convex lens which constitutes the second lens unit is lowered, and the radius of curvature of the convex lens which constitutes the second lens unit decreases. As a result, the high order aberration of the spherical aberration in the telephoto end increases, and it becomes difficult to achieve the adequate optical performance. On the contrary, if the condition of the lower limit of the Expression (6) is not satisfied, the secondary spectrum of the axial chromatic aberration in the telephoto end increases, and it becomes difficult to adequately correct the chromatic aberration in the telephoto end. It is desirable that the Expression (6) can be set further in the following way.

$$-2.15\times10^{-3} < (\theta2p - \theta2n)/(v2p - v2n) < -1.35\times10^{-3} \quad (6a)$$

The zoom lens of the present invention specifies that the second lens unit has a lens having an aspherical surface formed on at least one or more surfaces, as a further aspect. Pay attention to the height of the light beam of an on-axis light beam in the views of the light path in FIGS. 13A, 13B and 13C, and it is understood that a difference of the heights of the light beams in the second lens unit is large between the wide angle end and the telephoto end. Because of this, the lens having the aspherical surface formed thereon is adopted as the second lens unit. Thereby, the variation of the spherical aberration due to the zooming can be adequately corrected.

Furthermore, an image pickup apparatus according to the present invention has a zoom lens of each exemplary embodiment, and has an image pickup element that receives (photo-electrically converts) an optical image which has been formed by the zoom lens, and that has a predetermined effective imaging range.

The specific configuration of the zoom lens according to the present invention will be described below with reference to the features of the configurations of the lenses of Numeric Embodiments 1 to 6, which correspond to Exemplary Embodiments 1 to 6 respectively.

Exemplary Embodiment 1

Figure 1:
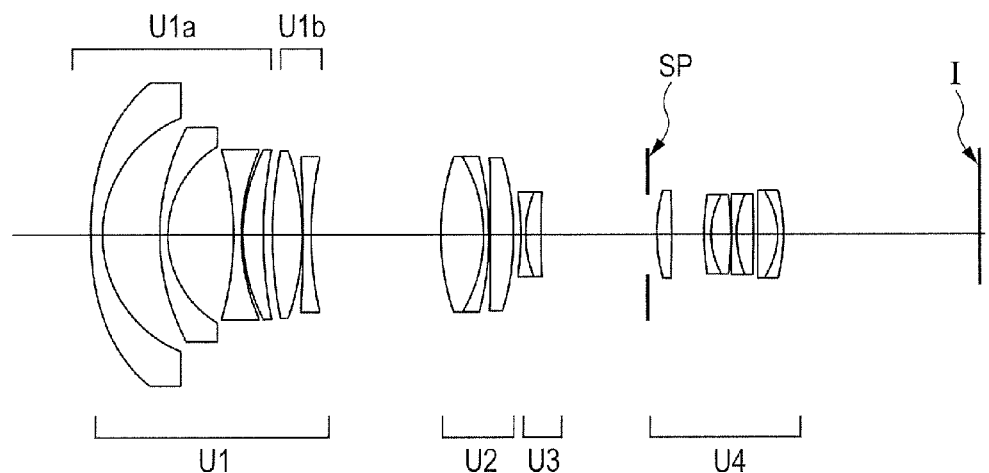
FIG. 1 illustrates a sectional view of lenses when a zoom lens is set at a wide angle end and focuses on infinity, in Numeric Embodiment 1.
Figure 2A:
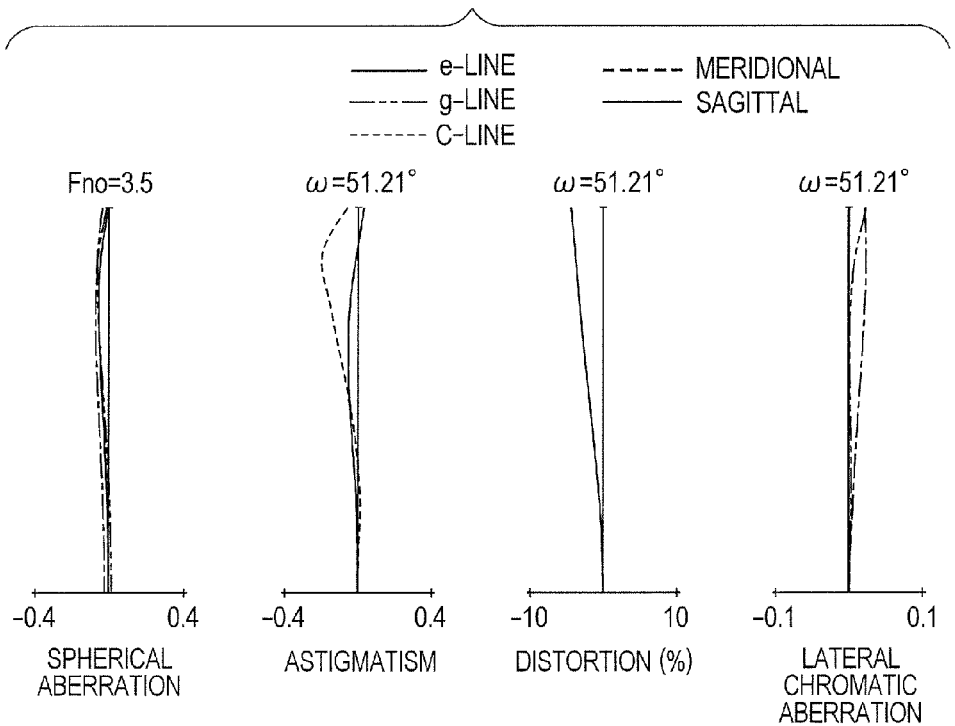
FIG. 2A illustrates views of aberration when the zoom lens is set at the wide angle end and focuses on infinity, in Numeric Embodiment 1.

FIG. 1 is a sectional view of lenses at the time when the zoom lens of Exemplary Embodiment 1 (Numeric Embodiment 1) according to the present invention is set in a wide angle end and focuses on infinity. FIG. 2A illustrates views of longitudinal aberration at the time when the zoom lens is set in the wide angle end in Numeric Embodiment 1; FIG. 2B illustrates views of longitudinal aberration at the time when the focal length is set at 18.75 mm in Numeric Embodiment 1; and FIG. 2C illustrates views of longitudinal aberration at the time when the zoom lens is set in the telephoto end in Numeric Embodiment 1. Any view of the aberration is a view of the longitudinal aberration at the time when the zoom lens focuses on infinity. In addition, the value of the focal length is such a value that a value of the focal length in the numeric embodiments which will be described later is expressed by a mm unit. The above description is the same in all of the following numeric embodiments.

In FIG. 1, the zoom lens has, in order from the object side to the image side, a first lens unit U1 for focusing, which has a negative refractive power. The zoom lens has further a second lens unit U2 for zooming, which moves to the object side during zooming from the wide angle end to the telephoto end and has a positive refractive power. The zoom lens has still a third lens unit U3 which moves non-linearly on the optical axis in synchronization with the movement of the second lens unit U2, corrects the variation of the image plane due to the zooming and has a negative refractive power. The zoom lens has still further a fourth lens unit U4 which does not move for zooming, performs an imaging operation and has a positive refractive power.

The second lens unit U2 and the third lens unit U3 constitute a variator. An aperture stop SP is arranged in the object side of the fourth lens unit U4. An image plane I corresponds to an imaging plane of an image pickup element (photoelectric conversion element) or the like, which receives an optical image formed by the zoom lens and converts the optical image to an electric signal, when being used as an image pickup optical system of a broadcasting television camera, a video camera and a digital still camera. When being used as an image pickup optical system of a camera for a film, the image plane corresponds to a film surface which senses light of an image formed by the zoom lens.

In the view of the longitudinal aberration, a straight line, a chain double-dashed line and an alternate long and short dashed line in the spherical aberration are the e-line, the g-line and the C-line respectively. The dotted lines and the solid lines in the astigmatism are a meridional image plane and a sagittal image plane respectively; and a chain double-dashed line and an alternate long and short dashed line in the lateral chromatic aberration are the g-line and the C-line respectively. A half angle of view w is shown, and an F-number Fno is shown. In the view of the longitudinal aberration, the spherical aberration is drawn with a scale of 0.4 mm, the astigmatism is drawn with a scale of 0.4 mm, the distortion is drawn with a scale of 10%, and the lateral chromatic aberration is drawn with a scale of 0.1 mm. Incidentally, in each of the following exemplary embodiments, the wide angle end and the telephoto end mean zoom positions shown when the zoom lens is positioned in both ends in such a range that the second unit U2 for zooming can move on the optical axis with respect to the mechanism respectively.

Next, the first lens unit U1 in the present exemplary embodiment will be described. The first lens unit U1 corresponds to a first surface to a 12th surface. The first lens unit U1 includes: a first sub lens unit U1a having a negative refractive power which does not move for focusing; and a second sub lens unit U1b having a positive refractive power which moves to the image side when the focus is moved to an extremely close side from an infinity side. The first sub lens unit U1a includes, in order from the object side to the image side: a meniscus concave lens G1 which is convex toward the object side; a meniscus concave lens G2 which is convex toward the object side; a biconcave lens G3; and a meniscus convex lens G4 which is concave toward the image side. In addition, the first surface has an aspherical surface shape, and mainly corrects distortion aberration and field curvature in the wide angle side. The second sub lens unit U1b includes: a biconvex lens G5; and a biconcave lens G6. The second lens unit U2 includes: a cemented lens of a biconvex lens and a meniscus concave lens which is convex toward the image side; and a biconvex lens. In addition, a 16th surface and a 17th surface have an aspherical surface shape, and mainly correct the variation of the spherical aberration due to the zooming. The third lens unit U3 includes a cemented lens of a biconcave lens and a meniscus convex lens which is concave toward the image side. The fourth lens unit U4 includes a convex lens and a concave lens, and is formed of seven lenses as a whole.

Numeric Embodiment 1 corresponding to the above described Exemplary Embodiment 1 will be described below. Not only in Numeric Embodiment 1 but also in all of the numeric embodiments, an order i of surfaces (optical surface) from the object side, a radius of curvature ri of the i-th surface from the object side, and a space (on optical axis) di between the i-th surface from the object side and the (i+1)-th surface from the object side are shown. In addition, a refractive index ndi, an Abbe number vdi and a partial dispersion ratio θgFi each of a medium (optical member) between the i-th surface and the (i+1)-th surface are shown; and an air-equivalent back-focus BF is shown. When an optical axis direction is determined to be an X-axis, a direction perpendicular to the optical axis is determined to be an H-axis, a traveling direction of light is determined to be positive, R represents a paraxial radius of curvature, k represents a conic constant, and A4, A6, A8, A10 and A12 each represent an aspherical coefficient, an aspherical surface shape is expressed by the following expression. In addition, "e-Z" means "×10$^{-Z}$".

$$X = \frac{H^2/R}{1+\sqrt{1-(1+k)(H/R)^2}} + \text{[Expression 1]}$$

$$A4H^4 + A6H^6 + A8H^8 + A10H^{10} + A12H^{12}$$

The values of the present exemplary embodiment, which correspond to each conditional expression, are shown in Table 1. The present exemplary embodiment satisfies the Expressions (1) to (6), and achieves a photographing angle of view (angle of view) of 102.4° in the wide angle end to widen the angle of view. The present exemplary embodiment also achieves a zoom lens which has various aberrations adequately corrected in the whole zooming region and has a high optical performance. However, it is indispensable for the zoom lens according to the present invention to satisfy the Expressions (1), (2) and (3), but it is acceptable not to satisfy the Expressions (4) to (6). However, if the zoom lens satisfies at least one of the Expressions (4) to (6), the zoom lens can show a more adequate effect. The above description is similar also in other exemplary embodiments.

Figure 16:
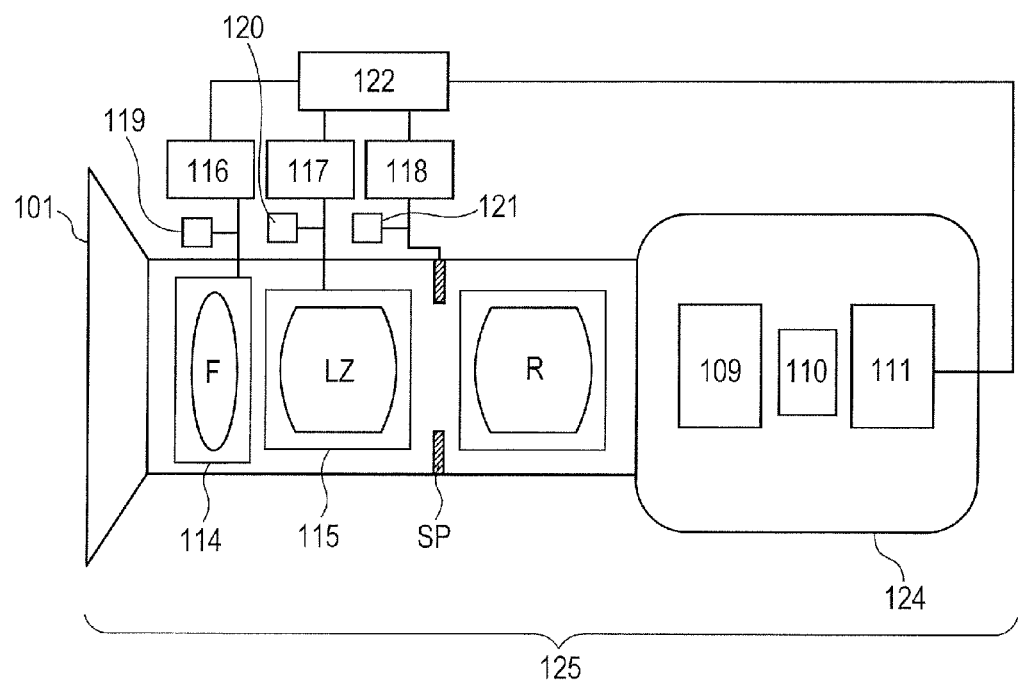
FIG. 16 illustrates a schematic view of an essential part of an image pickup apparatus according to the present invention.

FIG. 16 illustrates a schematic view of an image pickup apparatus (television camera system) which uses a zoom lens of each exemplary embodiment as a photographing optical system. In FIG. 16, a zoom lens 101 is any of zoom lenses in Exemplary Embodiments 1 to 6. A camera 124 is shown. The zoom lens 101 is structured so as to be removable from the camera 124. An image pickup apparatus 125 includes the camera 124 and the zoom lens 101 which is mounted on the camera. The zoom lens 101 has a first lens unit F, a zooming portion LZ, and a fourth lens unit R for imaging. The first lens unit F includes a lens unit for focusing. The zooming portion LZ includes: a second lens unit which moves on the optical axis for zooming; and a third lens unit which moves on the optical axis for correcting the variation of the image plane due to zooming. An aperture stop SP is shown. Driving mechanisms 114 and 115 include a helicoid and a cam, and drive the first lens unit F and the zooming portion LZ in the optical axis direction respectively. Motors (driving unit) 116 to 118 electrically drive the driving mechanisms 114 and 115 and the aperture stop SP. Detectors 119 to 121 include an encoder, a potentiometer and a photosensor, and detect positions of the first lens unit F and the zooming portion LZ on the optical axis, and the aperture stop diameter of the aperture stop SP. In the camera 124, a glass block 109 corresponds to an optical filter and a color separation optical system which are accommodated in the camera 124, and an image pickup element (photoelectric conversion element) 110 is a CCD sensor or a CMOS sensor, and receives (photoelectrically converts) a subject image (optical image) which has been formed by the zoom lens 101. In addition, CPUs 111 and 122 control various drivings of the camera 124 and the zoom lens 101.

Thus, the zoom lens according to the present invention is applied to a television camera, and thereby an image pickup apparatus having a high optical performance is achieved.

Exemplary Embodiment 2

Figure 3:
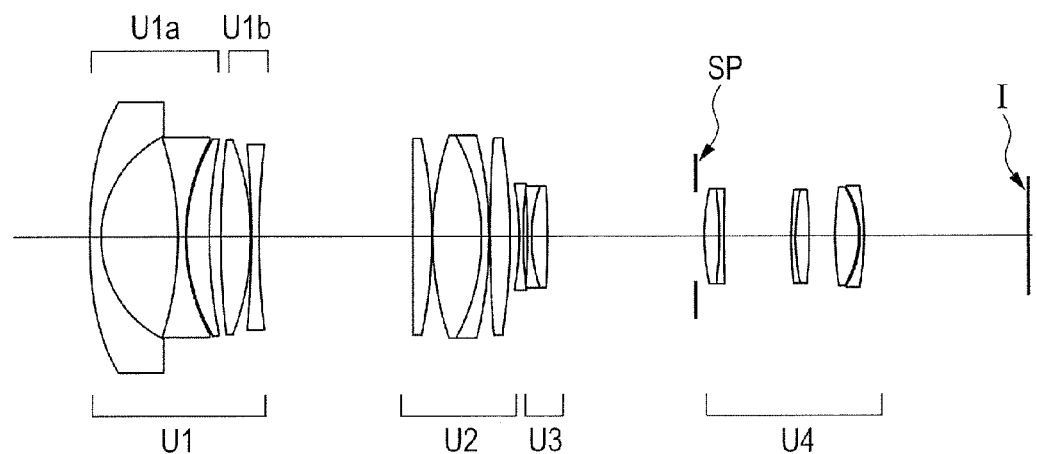
FIG. 3 illustrates a sectional view of lenses when a zoom lens is set at a wide angle end and focuses on infinity, in Numeric Embodiment 2.
Figure 4A:
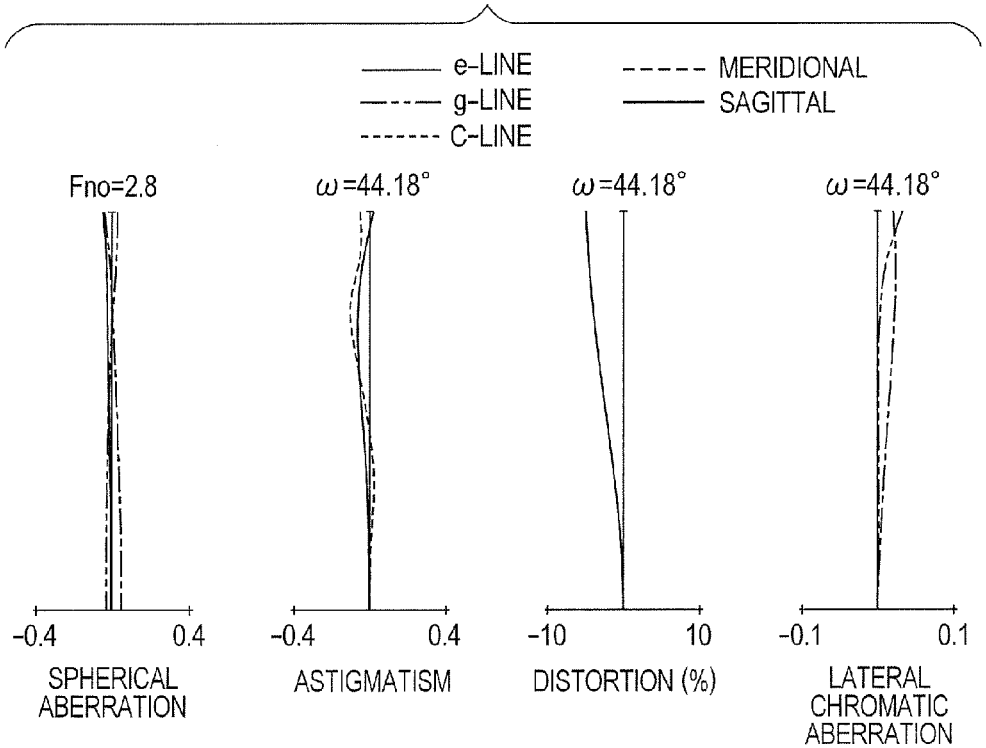
FIG. 4A illustrates views of aberration when the zoom lens is set at the wide angle end and focuses on infinity, in Numeric Embodiment 2.

FIG. 3 illustrates a sectional view of lenses at the time when the zoom lens of Exemplary Embodiment 2 (Numeric Embodiment 2) according to the present invention is set in a wide angle end and focuses on infinity. FIG. 4A illustrates views of longitudinal aberration at the time when the zoom lens is set in the wide angle end in Numeric Embodiment 2; FIG. 4B illustrates views of longitudinal aberration at the time when the focal length is set at 26.88 mm in Numeric Embodiment 2; and FIG. 4C illustrates views of longitudinal aberration at the time when the zoom lens is set in a telephoto end in Numeric Embodiment 2. Any view of the aberration is a view of the longitudinal aberration at the time when the zoom lens focuses on infinity. In FIG. 3, the zoom lens has, in order from the object side to the image side, a first lens unit U1 for focusing, which has a negative refractive power. The zoom lens has further a second lens unit U2 for zooming, which moves to the object side during zooming from the wide angle end to the telephoto end and has a positive refractive power. The zoom lens has still a third lens unit U3 which moves non-linearly on the optical axis in synchronization with the movement of the second lens unit U2, corrects the variation of the image plane due to the zooming, and has a negative refractive power. The zoom lens has still further a fourth lens unit U4 which does not move for zooming, performs an imaging operation, and has a positive refractive power.

Next, the first lens unit U1 in the present exemplary embodiment will be described. The first lens unit U1 corresponds to a first surface to a tenth surface. The first lens unit U1 includes: a first sub lens unit U1a having a negative refractive power which does not move for focusing; and a second sub lens unit U1b having a positive refractive power which moves to the image side when the focus is moved to an extremely close side from an infinity side. The first sub lens unit U1a includes, in order from the object side to the image side: a meniscus concave lens G1 which is convex toward the object side; a biconcave lens G2; and a meniscus convex lens G3 which is concave toward the image side. In addition, the first surface has an aspherical surface shape, and mainly corrects distortion aberration and field curvature in the wide angle side. The second sub lens unit U1b includes: a biconvex lens G4; and a biconcave lens G5. The second lens unit U2 includes: a meniscus convex lens which is concave toward the object side; a cemented lens of a biconvex lens and a meniscus concave lens which is convex toward the image side; and a biconvex lens. In addition, a 16th surface and a 17th surface have an aspherical surface shape, and mainly correct the variation of the spherical aberration due to the zooming. The third lens unit U3 includes: a biconcave lens; and a cemented lens of a biconcave lens and a biconvex lens. The fourth lens unit U4 includes a convex lens and a concave lens, and is formed of six lenses as a whole. The values of the present exemplary embodiment, which correspond to each conditional expression, are shown in Table 1. The present exemplary embodiment satisfies the Expressions (1) to (6), and achieves a photographing angle of view (angle of view) of 88.4° in the wide angle end to widen the angle of view. The present exemplary embodiment also achieves the zoom lens which has various aberrations adequately corrected in the whole zooming region and has a high optical performance.

Exemplary Embodiment 3

Figure 5:
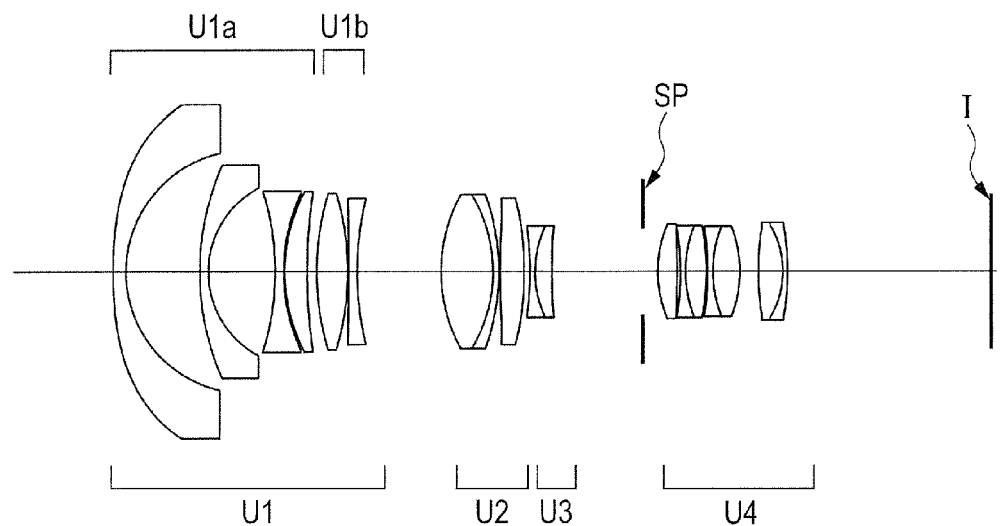
FIG. 5 illustrates a sectional view of lenses when a zoom lens is set at a wide angle end and focuses on infinity, in Numeric Embodiment 3.
Figure 6A:
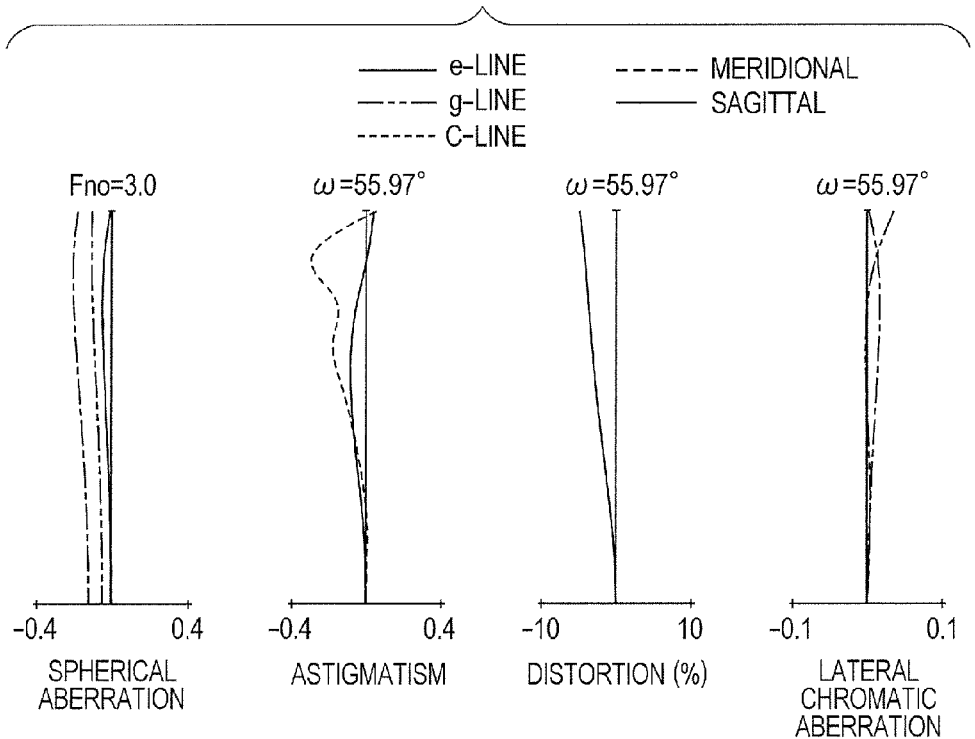
FIG. 6A illustrates views of aberration when the zoom lens is set at the wide angle end and focuses on infinity, in Numeric Embodiment 3.
Figure 6B:
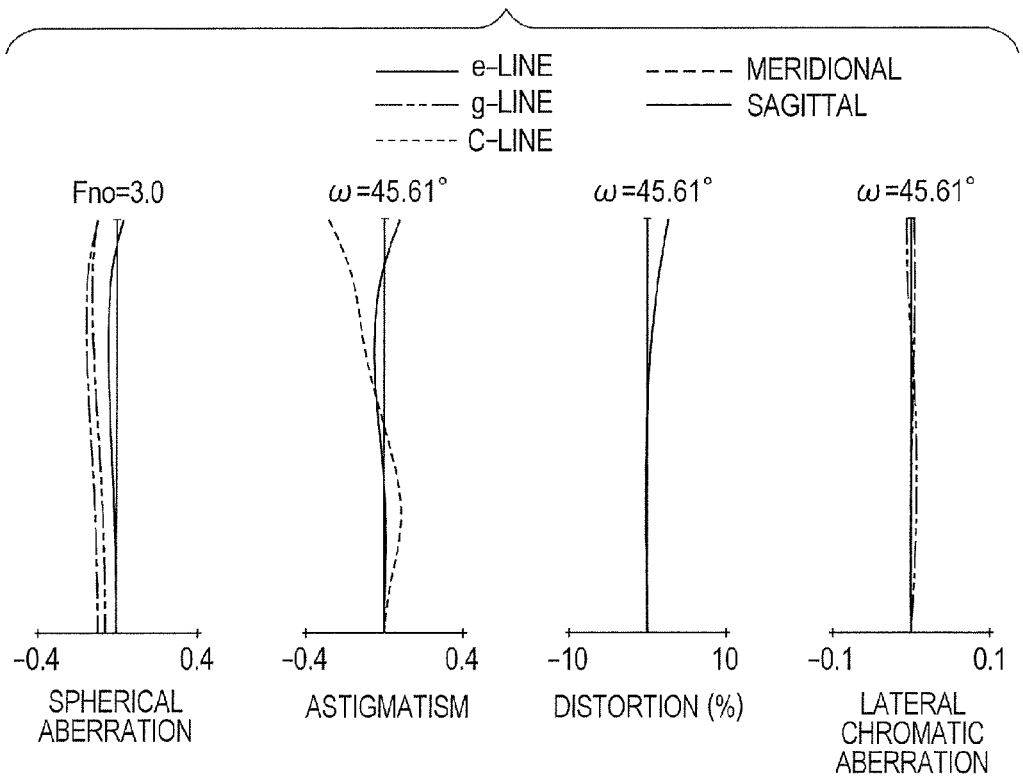
FIG. 6B illustrates views of aberration when the zoom lens is set at the middle of the zoom and focuses on infinity, in Numeric Embodiment 3.
Figure 6C:
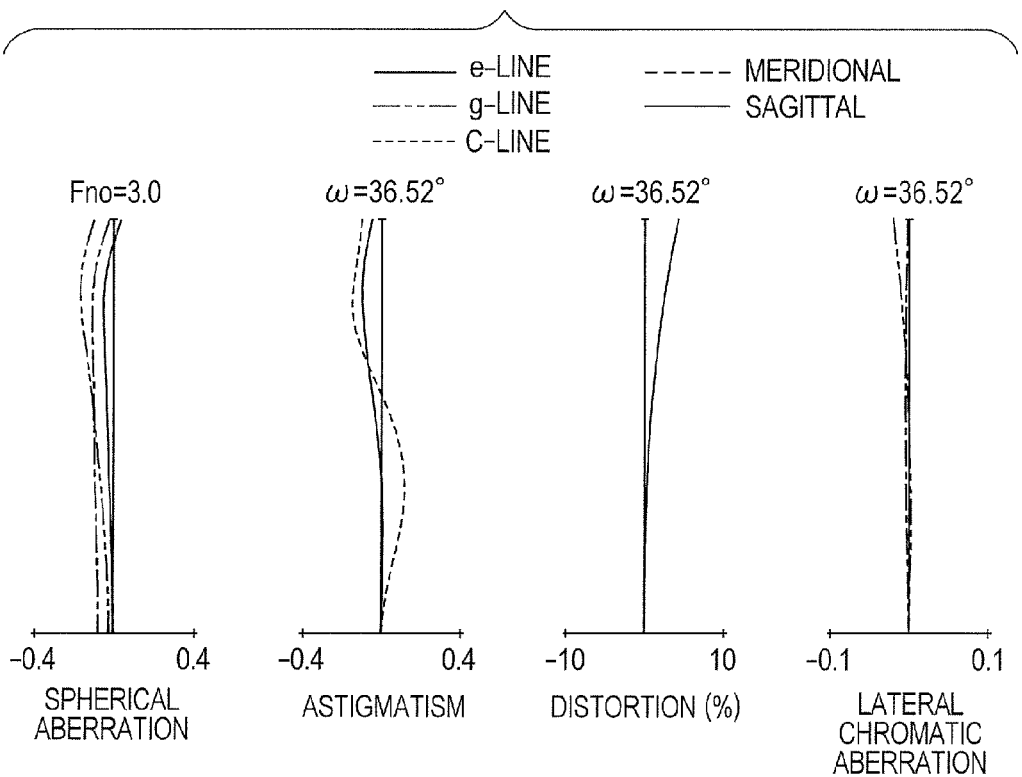
FIG. 6C illustrates views of aberration when the zoom lens is set at the telephoto end (c) and focuses on infinity, in Numeric Embodiment 3.

FIG. 5 illustrates a sectional view of lenses at the time when a zoom lens of Exemplary Embodiment 3 (Numeric Embodiment 3) according to the present invention is set in a wide angle end and focuses on infinity. FIG. 6A illustrates views of longitudinal aberration at the time when the zoom lens is set in the wide angle end in Numeric Embodiment 3; FIG. 6B illustrates views of longitudinal aberration at the time when the focal length is set at 15.23 mm in Numeric Embodiment 3; and FIG. 6C illustrates views of longitudinal aberration at the time when the zoom lens is set in the telephoto end in Numeric Embodiment 3. Any view of the aberration is a view of the longitudinal aberration at the time when the zoom lens focuses on infinity.

In FIG. 5, the zoom lens has, in order from the object side to the image side, a first lens unit U1 for focusing, which has a negative refractive power. The zoom lens has further a second lens unit U2 for zooming, which moves to the object side during zooming from the wide angle end to the telephoto end and has a positive refractive power. The zoom lens has still a third lens unit U3 which moves non-linearly on the optical axis in synchronization with the movement of the second lens unit U2, corrects the variation of the image plane due to the zooming and has a negative refractive power. The zoom lens has still further a fourth lens unit U4 which does not move for zooming, performs an imaging operation, and has a positive refractive power.

Next, the first lens unit U1 in the present exemplary embodiment will be described. The first lens unit U1 corresponds to a first surface to a 12th surface. The first lens unit U1 includes: a first sub lens unit U1a having a negative refractive power which does not move for focusing; and a second sub lens unit U1b having a positive refractive power which moves to the image side when the focus is moved to an extremely close side from an infinity side. The first sub lens unit U1a includes, in order from the object side to the image side: a meniscus concave lens G1 which is convex toward the object side; a meniscus concave lens G2 which is convex toward the object side; a biconcave lens G3; and a meniscus convex lens G4 which is concave toward the image side. In addition, the first surface has an aspherical surface shape, and mainly corrects distortion aberration and field curvature in the wide angle side. The second sub lens unit U1b includes: a biconvex lens G5; and a biconcave lens G6. The second lens unit U2 includes: a cemented lens of a biconvex lens and a meniscus concave lens which is convex toward the image side; and a biconvex lens. In addition, a 16th surface and a 17th surface have an aspherical surface shape, and mainly correct the variation of the spherical aberration due to the zooming. The third lens unit U3 includes: a cemented lens of a biconcave lens and a meniscus convex lens which is concave toward the image side. The fourth lens unit U4 includes a convex lens and a concave lens, and is formed of seven lenses as a whole. The values of the present exemplary embodiment, which correspond to each conditional expression, are shown in Table 1. The present exemplary embodiment satisfies the Expressions (1) to (6), and achieves a photographing angle of view (angle of view) of 112.0° in the wide angle end to widen the angle of view. The present exemplary embodiment also achieves a zoom lens which has various aberrations adequately corrected in the whole zooming region and has a high optical performance.

Exemplary Embodiment 4

Figure 7:
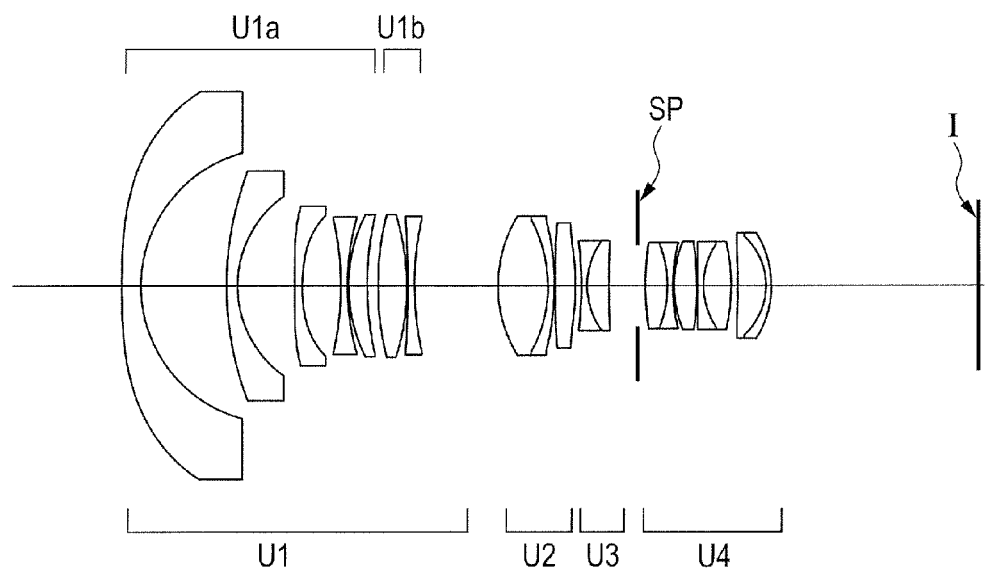
FIG. 7 illustrates a sectional view of lenses when a zoom lens is set at a wide angle end and focuses on infinity, in Numeric Embodiment 4.
Figure 8A:
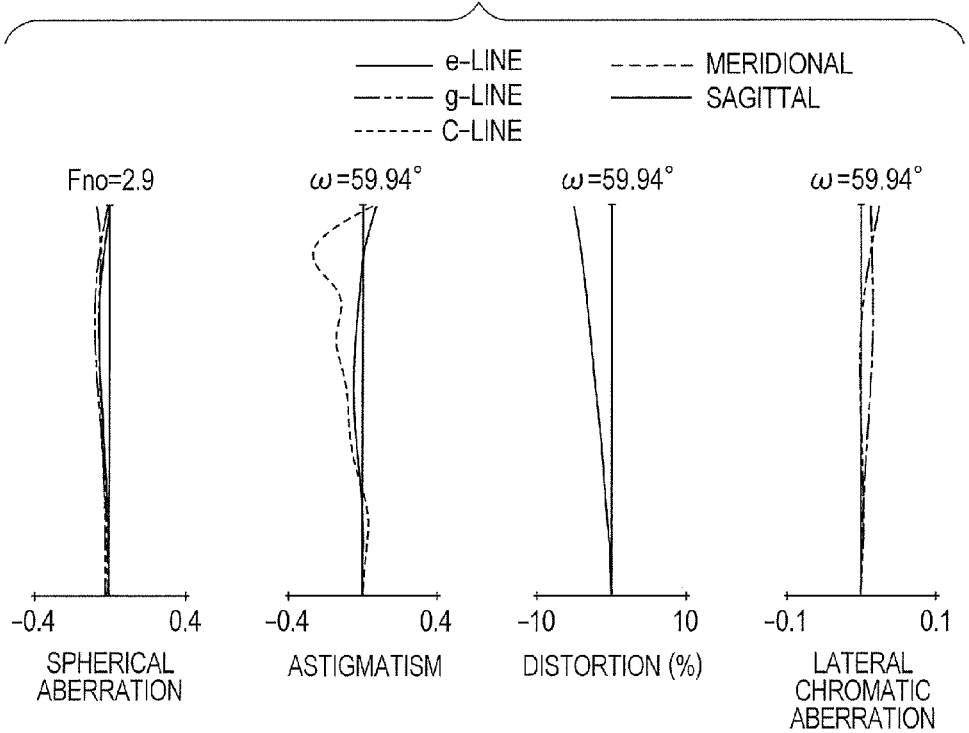
FIG. 8A illustrates views of aberration when the zoom lens is set at the wide angle end and focuses on infinity, in Numeric Embodiment 4.
Figure 8B:
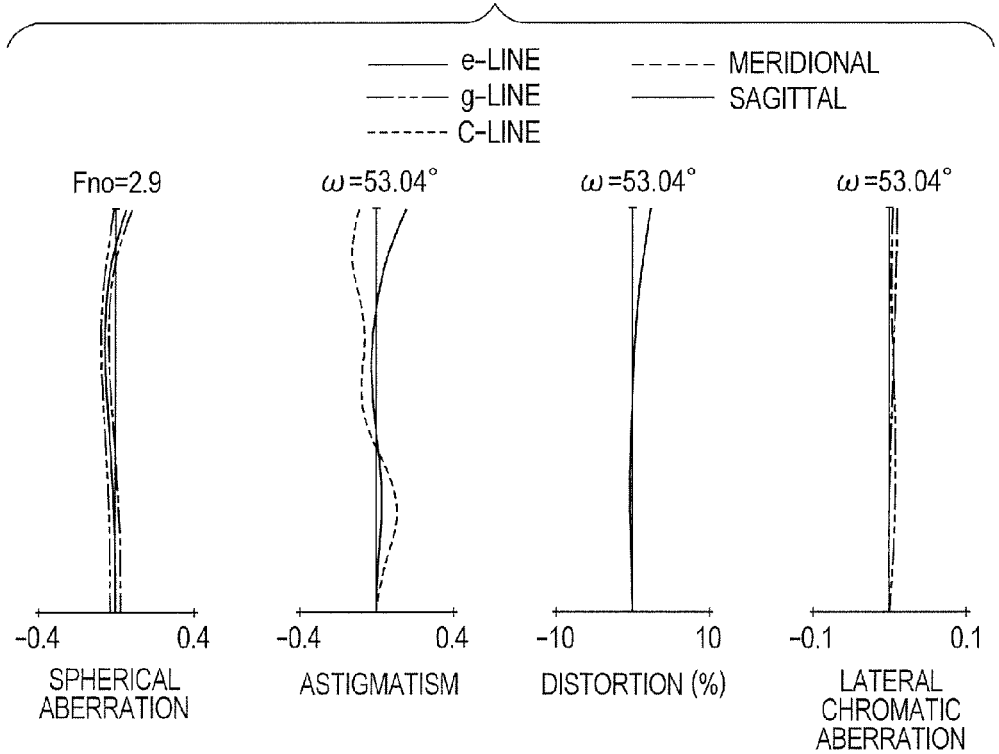
FIG. 8B illustrates views of aberration when the zoom lens is set at the middle of the zoom and focuses on infinity, in Numeric Embodiment 4.
Figure 8C:
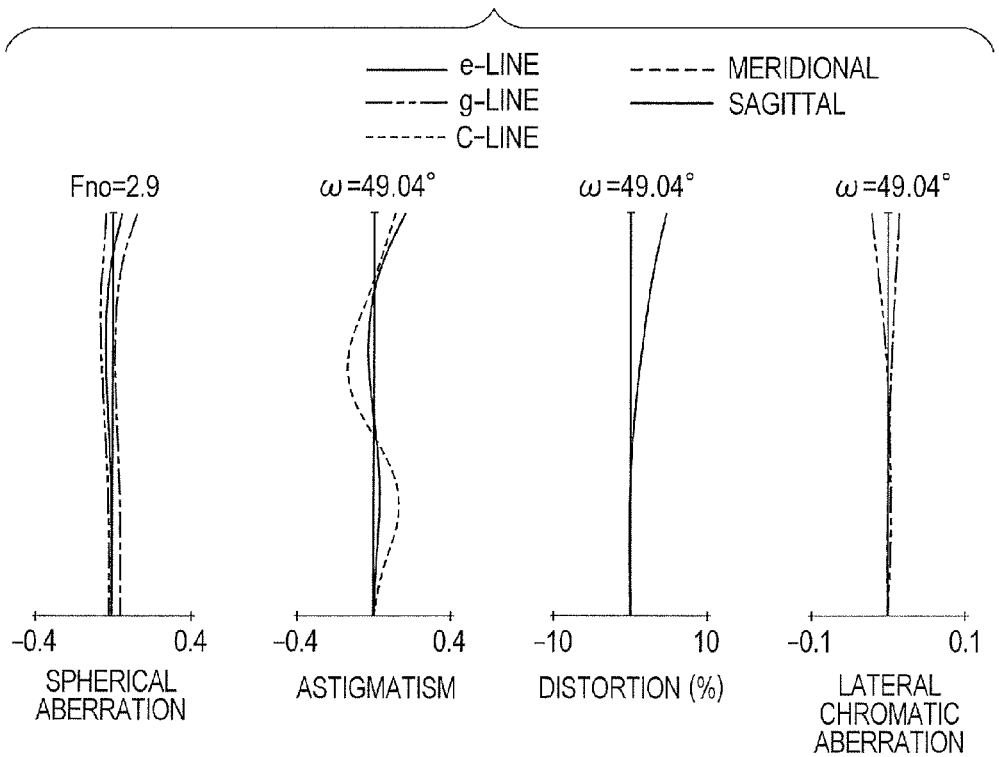
FIG. 8C illustrates views of aberration when the zoom lens is set at a telephoto end and focuses on infinity, in Numeric Embodiment 4.

FIG. 7 illustrates a sectional view of lenses at the time when a zoom lens of Exemplary Embodiment 4 (Numeric Embodiment 4) according to the present invention is set in a wide angle end and focuses on infinity. FIG. 8A illustrates views of longitudinal aberration at the time when the zoom lens is set in the wide angle end in Numeric Embodiment 4; FIG. 8B illustrates views of longitudinal aberration at the time when the focal length is set at 11.7 mm in Numeric Embodiment 4; and FIG. 8C illustrates views of longitudinal aberration at the time when the zoom lens is set in the telephoto end in Numeric Embodiment 4. Any view of the aberration is a view of the longitudinal aberration at the time when the zoom lens focuses on infinity.

In FIG. 7, the zoom lens has, in order from the object side to the image side, a first lens unit U1 for focusing, which has a negative refractive power. The zoom lens has further a second lens unit U2 for zooming, which moves to the object side during zooming from the wide angle end to the telephoto end and has a positive refractive power. The zoom lens has still a third lens unit U3 which moves non-linearly on the optical axis in synchronization with the movement of the second lens unit U2, corrects the variation of the image plane due to the zooming and has a negative refractive power. The zoom lens has still further a fourth lens unit U4 which does not move for zooming, performs an imaging operation, and has a positive refractive power.

Next, the first lens unit U1 in the present exemplary embodiment will be described. The first lens unit U1 corresponds to a first surface to a 14th surface. The first lens unit U1 includes: a first sub lens unit U1a having a negative refractive power which does not move for focusing; and a second sub lens unit U1b having a positive refractive power which moves to the image side when the focus is moved to an extremely close side from an infinity side. The first sub lens unit U1a includes, in order from the object side to the image side: a meniscus concave lens G1 which is convex toward the object side; a meniscus concave lens G2 which is convex toward the object side; a meniscus concave lens G3 which is convex toward the object side; a biconcave lens G4; and a meniscus convex lens G5 which is concave toward the image side. In addition, the first surface, the fifth surface and the sixth surface have an aspherical surface shape, and mainly correct distortion aberration and field curvature in the wide angle side. The second sub lens unit U1b includes; a biconvex lens G6; and a biconcave lens G7. The second lens unit U2 includes: a cemented lens of a biconvex lens and a meniscus concave lens which is convex toward the image side; and a biconvex lens. In addition, an 18th surface and a 19th surface have an aspherical surface shape, and mainly correct the variation of the spherical aberration due to the zooming. The third lens unit U3 includes: a cemented lens of a biconcave lens and a meniscus convex lens which is concave toward the image side. The fourth lens unit U4 includes a convex lens and a concave lens, and is formed of seven lenses as a whole. The values of the present exemplary embodiment, which correspond to each conditional expression, are shown in Table 1. The present exemplary embodiment satisfies the Expressions (1) to (6), and achieves a photographing angle of view (angle of view) of 120.0° in the wide angle end to widen the angle of view. The present exemplary embodiment also achieves a zoom lens which has various aberrations adequately corrected in the whole zooming region and has a high optical performance.

Exemplary Embodiment 5

Figure 9:
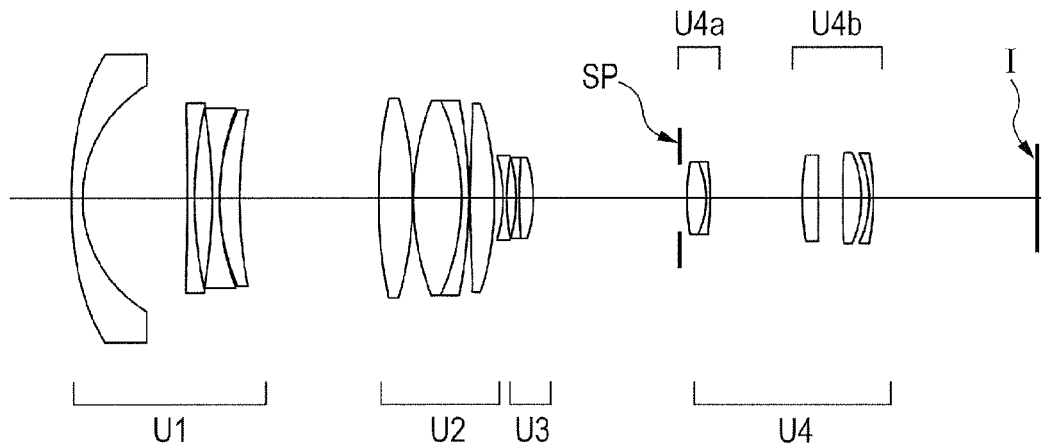
FIG. 9 illustrates a sectional view of lenses when a zoom lens is set at a wide angle end and focuses on infinity, in Numeric Embodiment 5.
Figure 10A:
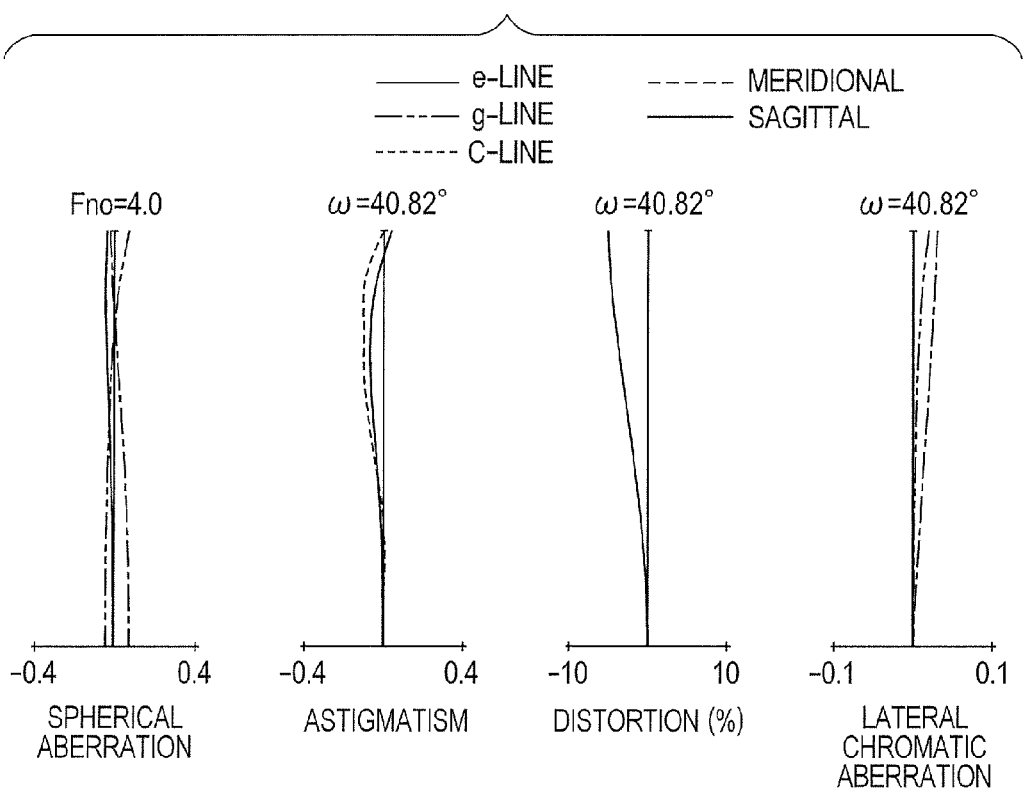
FIG. 10A illustrates views of aberration when the zoom lens is set at the wide angle end and focuses on infinity, in Numeric Embodiment 5.
Figure 10B:
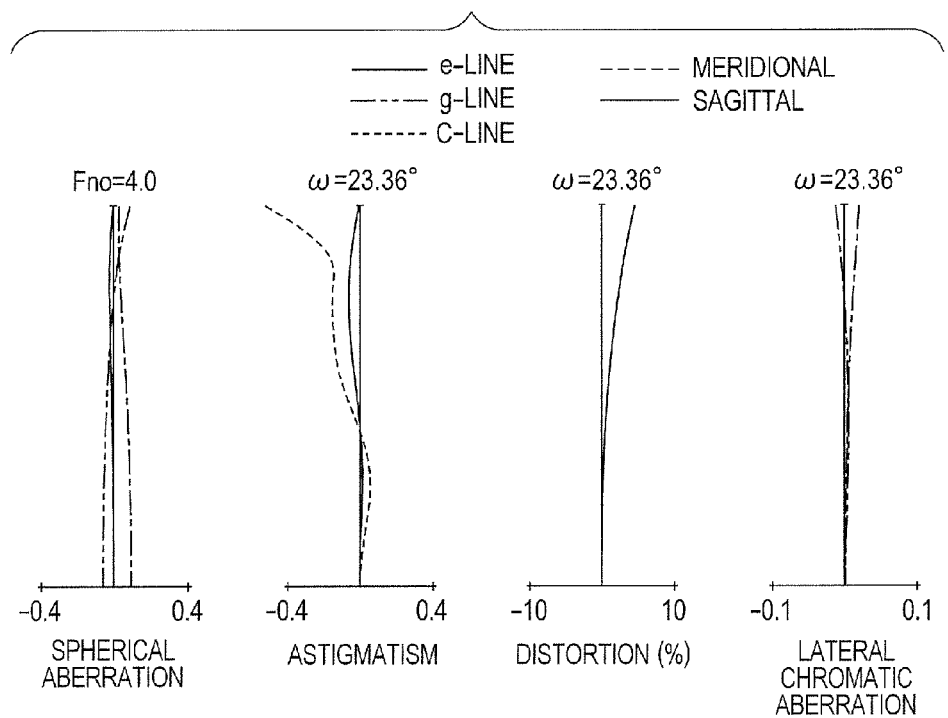
FIG. 10B illustrates views of aberration when the zoom lens is set at the middle of the zoom and focuses on infinity, in Numeric Embodiment 5.
Figure 10C:
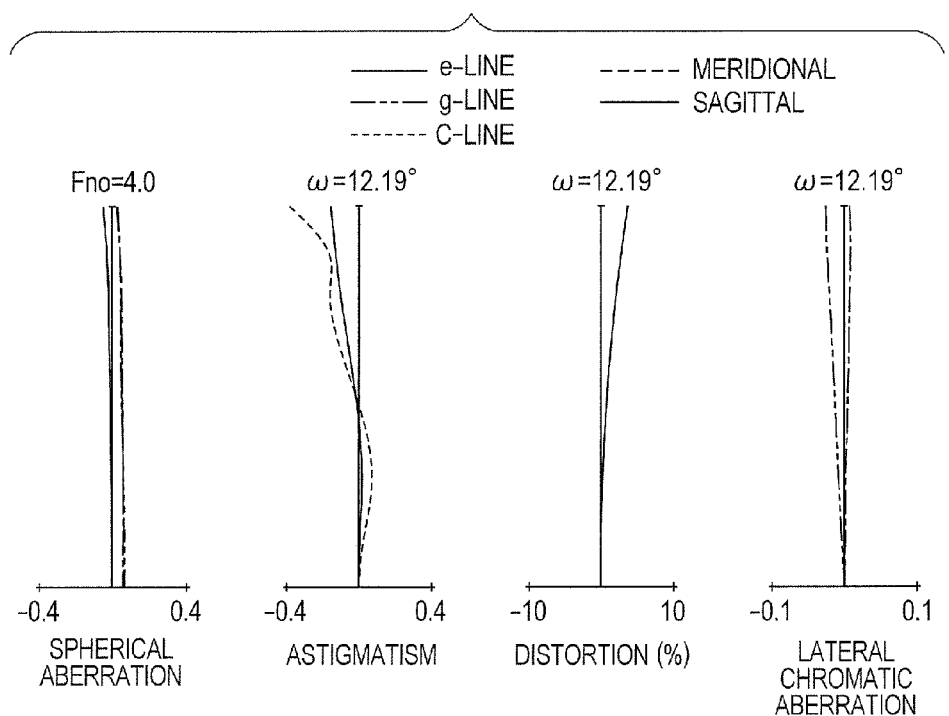
FIG. 10C illustrates views of aberration when the zoom lens is set at a telephoto end and focuses on infinity, in Numeric Embodiment 5.

FIG. 9 illustrates a sectional view of lenses at the time when a zoom lens of Exemplary Embodiment 5 (Numeric Embodiment 5) according to the present invention is set in a wide angle end and focuses on infinity. FIG. 10A illustrates views of longitudinal aberration at the time when the zoom lens is set in the wide angle end in Numeric Embodiment 5; FIG. 10B illustrates views of longitudinal aberration at the time when the focal length is set at 36 mm in Numeric Embodiment 5; and FIG. 10C illustrates views of longitudinal aberration at the time when the zoom lens is set in a telephoto end in Numeric Embodiment 5. Any view of the aberration is a view of the longitudinal aberration at the time when the zoom lens focuses on infinity.

In FIG. 9, the zoom lens has, in order from the object side to the image side, a first lens unit U1 having a negative refractive power. The zoom lens has further a second lens unit U2 for zooming, which moves to the object side during zooming from the wide angle end to the telephoto end and has a positive refractive power. The zoom lens has still a third lens unit U3 which moves non-linearly on the optical axis in synchronization with the movement of the second lens unit U2, corrects the variation of the image plane due to the zooming, and has a negative refractive power. The zoom lens has still further a fourth lens unit U4 which does not move for zooming, performs an imaging operation, and has a positive refractive power.

Next, the first lens unit U1 in the present exemplary embodiment will be described. The first lens unit U1 corresponds to a first surface to an eighth surface. The first sub lens unit U1 includes, in order from the object side to the image side: a meniscus concave lens G1 which is convex toward the object side; a biconcave lens G2; a biconcave lens G3; and a meniscus convex lens G4 which is concave toward the image side. In addition, the first surface has an aspherical surface shape, and mainly corrects distortion aberration and field curvature in the wide angle side. The second lens unit U2 includes: a biconvex lens; a cemented lens of a biconvex lens and a meniscus concave lens which is convex toward the image side; and a biconvex lens. In addition, a 14th surface and a 15th surface have an aspherical surface shape, and mainly correct the variation of the spherical aberration due to zooming. The third lens unit U3 includes: a biconcave lens; and a cemented lens of a biconcave lens and a biconvex lens. A 16th surface has an aspherical surface shape, and mainly corrects the variation of the field curvature due to zooming. The fourth lens unit U4 includes: a 41 lens unit U4a which does not move for focusing; and a 42 lens unit U4b which moves to the object side when the focus is moved to an extremely close end side from an infinity side. The 41 lens unit U4a includes a cemented lens of a biconvex lens G1 and a meniscus concave lens G2 which is convex toward the object side. The 42 lens unit U4b includes a convex lens and a concave lens, and is formed of three lenses as a whole. The values of the present exemplary embodiment, which correspond to each conditional expression, are shown in Table 1. The present exemplary embodiment satisfies the Expressions (1) to (3), (5) and (6), and achieves a photographing angle of view (angle of view) of 81.6° at the wide angle end to widen the angle of view. The present exemplary embodiment also achieves the zoom lens which has various aberrations adequately corrected in the whole zooming region and has a high optical performance.

Exemplary Embodiment 6

Figure 11:
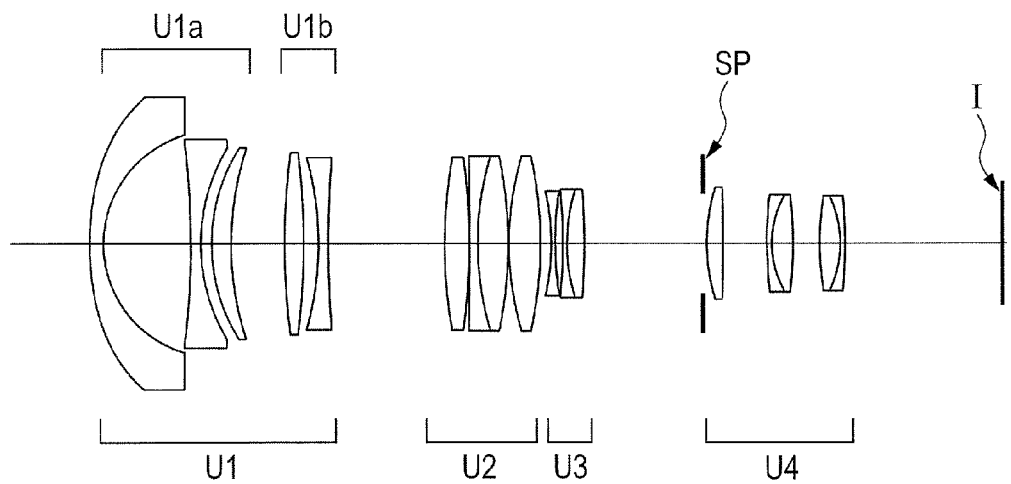
FIG. 11 illustrates a sectional view of lenses when a zoom lens is set at a wide angle end and focuses on infinity, in Numeric Embodiment 6.
Figure 12A:
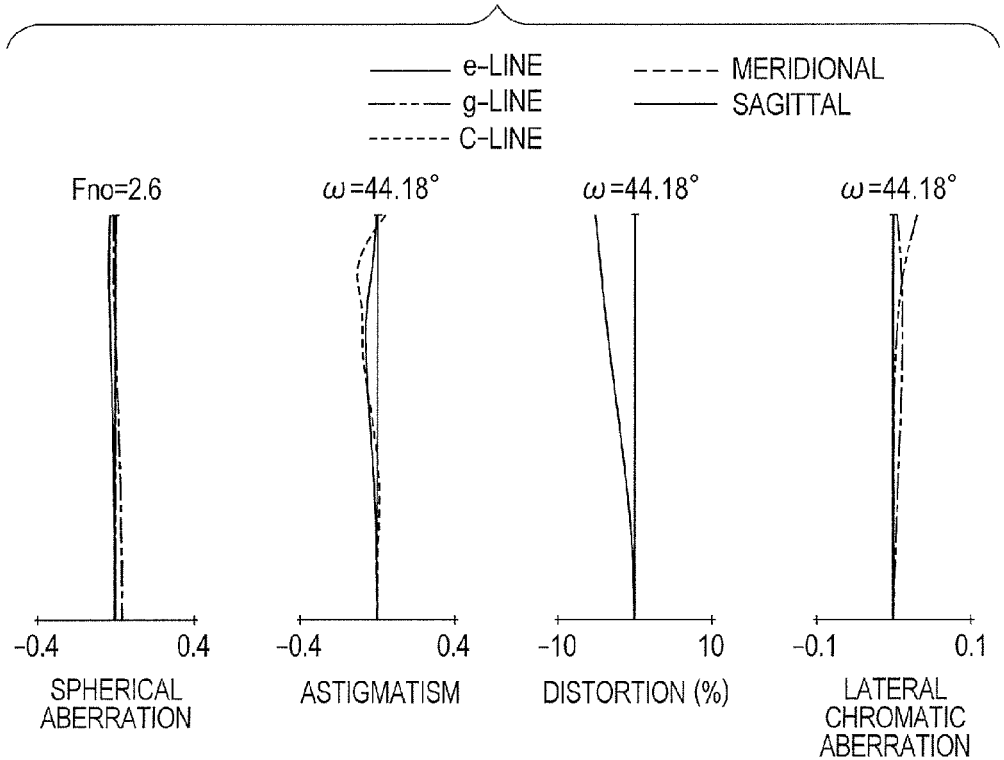
FIG. 12A illustrates views of aberration at the time when the zoom lens is set in the wide angle end and focuses on infinity, in Numeric Embodiment 6.
Figure 12B:
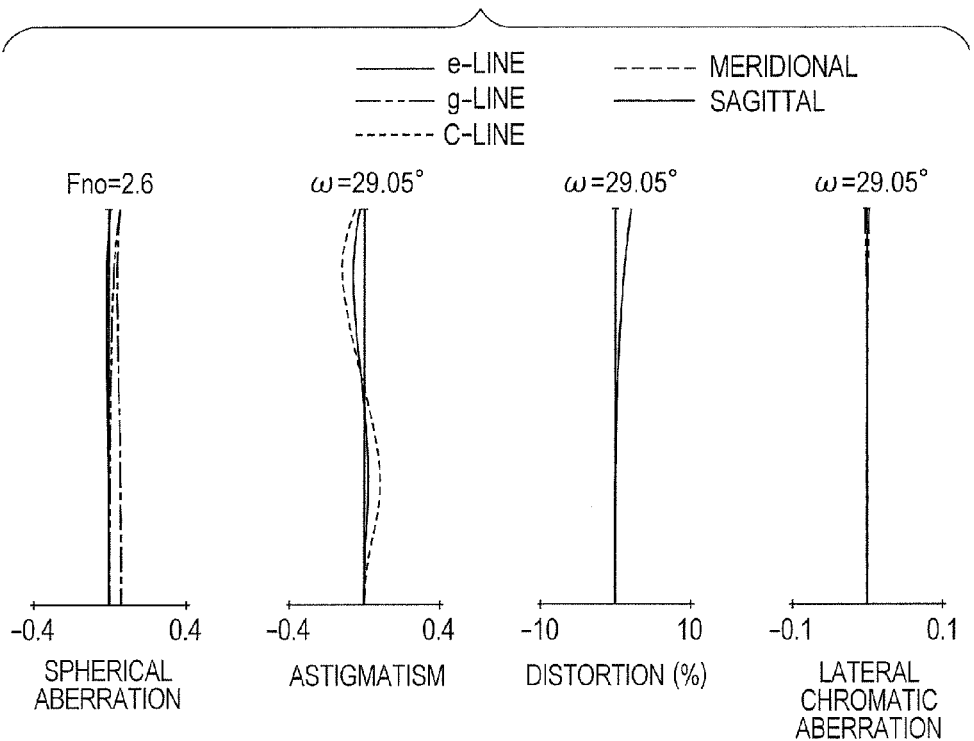
FIG. 12B illustrates views of aberration at the time when the zoom lens is set in the middle of the zoom and focuses on infinity, in Numeric Embodiment 6.
Figure 12C:
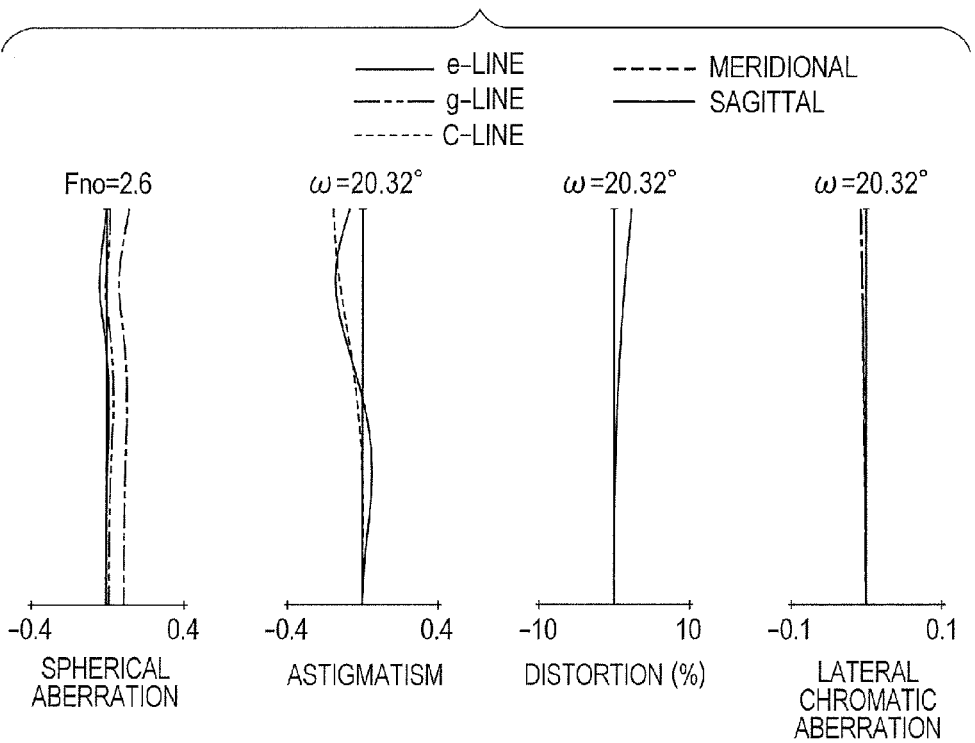
FIG. 12C illustrates views of aberration at the time when the zoom lens is set in a telephoto end and focuses on infinity, in Numeric Embodiment 6.

FIG. 11 is a sectional view of lenses at the time when the zoom lens of Exemplary Embodiment 6 (Numeric Embodiment 6) according to the present invention is set in a wide angle end and focuses on infinity. FIG. 12A illustrates views of longitudinal aberration at the time when the zoom lens is set in the wide angle end in Numeric Embodiment 6; FIG. 12B illustrates views of longitudinal aberration at the time when the focal length is set at 28 mm in Numeric Embodiment 6; and FIG. 12C illustrates views of longitudinal aberration at the time when the zoom lens is set in a telephoto end in Numeric Embodiment 6. Any view of the aberration is a view of the longitudinal aberration at the time when the zoom lens focuses on infinity.

In FIG. 11, the zoom lens has, in order from the object side to the image side, a first lens unit U1 for focusing, which has a negative refractive power. The zoom lens has further a second lens unit U2 which moves to the object side during zooming from the wide angle end to the telephoto end, and has a positive refractive power; and a fourth lens unit U4 having a positive refractive power. The zoom lens has still further a third lens unit U3 which moves non-linearly on the optical axis in synchronization with the movement of the second lens unit U2 and the fourth lens unit U4, corrects the variation of the image plane due to the zooming, and has a negative refractive power.

Next, the first lens unit U1 in the present exemplary embodiment will be described. The first lens unit U1 corresponds to a first surface to a tenth surface. The first lens unit U1 includes: a first sub lens unit U1a having a negative refractive power which does not move for focusing; and a second sub lens unit U1b having a negative refractive power which moves to the object side when the focus is moved to an extremely close side from an infinity side. The first sub lens unit U1a includes, in order from the object side to the image side: a meniscus concave lens G1 which is convex toward the object side; a biconcave lens G2; and a meniscus convex lens G3 which is concave toward the image side. In addition, the first surface has an aspherical surface shape, and mainly corrects distortion aberration and field curvature in the wide angle side. The second sub lens unit U1b includes: a biconvex lens G4; and a biconcave lens G5. The second lens unit U2 includes: a biconvex lens; a cemented lens of a biconcave lens and a biconvex lens; and a biconvex lens. In addition, a 16th surface and a 17th surface have an aspherical surface shape, and mainly correct the variation of the spherical aberration due to the zooming. The third lens unit U3 includes: a biconcave lens; and a cemented lens of a biconcave lens and a biconvex lens. The fourth lens unit U4 includes a convex lens and a concave lens, and is formed of five lenses as a whole. Furthermore, the fourth lens unit U4 is moved to the object side during zooming from a wide angle end to a telephoto end, and thereby aberration due to the zooming can be adequately corrected. In addition, the aperture stop approaches the object side in the telephoto end, and accordingly the height of the light beam of an off-axis light beam in a side closer to the object side than the aperture stop is reduced. As a result, the lens diameters of the second sub lens unit and the second lens unit can be reduced. The values of the present exemplary embodiment, which correspond to each conditional expression, are shown in Table 1. The present exemplary embodiment satisfies the Expressions (1) to (6), and achieves a photographing angle of view (angle of view) of 88.4° in the wide angle end to widen the angle of view. The present exemplary embodiment also achieves the zoom lens which has various aberrations adequately corrected in the whole zooming region and has a high optical performance.

Exemplary embodiments according to the present invention have been described above, but the present invention is not limited to these exemplary embodiments, and can be modified and changed in various ways in such a range as not to deviate from the scope.

Numeric Embodiment 1

| Surface number | r | d | nd | vd | θgF | Effective diameter | Focal length |
|---|---|---|---|---|---|---|---|
| | | | Unit mm | | | | |
| 1* | 69.91896 | 2.56500 | 1.772499 | 49.60 | 0.5521 | 64.133 | −58.733 |
| 2 | 27.15350 | 12.46346 | | | | 49.081 | |
| 3 | 49.07729 | 1.71000 | 1.763850 | 48.56 | 0.5594 | 44.998 | −54.123 |
| 4 | 22.15839 | 14.36164 | | | | 36.704 | |
| 5 | −64.84229 | 1.71000 | 1.696797 | 55.53 | 0.5433 | 35.460 | −37.787 |
| 6 | 45.13753 | 0.33776 | | | | 34.844 | |
| 7 | 40.02401 | 4.44257 | 1.854780 | 24.80 | 0.6121 | 35.301 | 76.901 |
| 8 | 95.67024 | 1.98832 | | | | 34.888 | |
| 9 | 94.98543 | 6.50372 | 1.595220 | 67.74 | 0.5442 | 34.734 | 57.965 |
| 10 | −53.08890 | 0.18564 | | | | 34.351 | |
| 11 | −249.42636 | 1.71000 | 1.772499 | 49.60 | 0.5521 | 32.312 | −74.800 |
| 12 | 75.90246 | (Variable) | | | | 30.901 | |
| 13 | 52.07986 | 9.27522 | 1.620411 | 60.29 | 0.5426 | 32.175 | 33.656 |
| 14 | −32.68704 | 1.20000 | 1.854780 | 24.80 | 0.6121 | 32.009 | −77.109 |
| 15 | −65.34371 | 0.17100 | | | | 32.302 | |
| 16* | 272.54183 | 5.14077 | 1.583126 | 59.38 | 0.5423 | 31.705 | 93.301 |
| 17* | −67.84118 | (Variable) | | | | 31.379 | |
| 18 | −57.79581 | 1.00000 | 1.882997 | 40.76 | 0.5667 | 17.043 | −18.981 |
| 19 | 23.99271 | 3.27190 | 1.808095 | 22.76 | 0.6307 | 17.015 | 35.085 |
| 20 | 138.68879 | (Variable) | | | | 17.056 | |
| 21 (Aperture stop) | ∞ | 1.97548 | | | | 17.254 | |
| 22 | 34.91800 | 3.24931 | 1.589130 | 61.14 | 0.5406 | 17.687 | 53.408 |
| 23 | −319.68817 | 7.00000 | | | | 17.473 | |
| 24 | 54.11174 | 1.50000 | 1.800999 | 34.97 | 0.5863 | 15.900 | −31.446 |
| 25 | 17.05312 | 4.40938 | 1.717362 | 29.50 | 0.6048 | 15.512 | 18.921 |
| 26 | −61.70060 | 0.20000 | | | | 15.710 | |
| 27 | −162.07811 | 1.00000 | 1.800999 | 34.97 | 0.5863 | 15.701 | −23.969 |
| 28 | 22.00702 | 3.71101 | 1.496999 | 81.54 | 0.5374 | 15.789 | 39.803 |
| 29 | −190.19744 | 0.99405 | | | | 16.210 | |
| 30 | −692.87917 | 4.23771 | 1.496999 | 81.54 | 0.5374 | 16.503 | 34.107 |
| 31 | −16.62727 | 1.28250 | 1.854780 | 24.80 | 0.6121 | 16.865 | −35.327 |
| 32 | −37.88640 | 42.84 | | | | 17.790 | |
| Image plane | ∞ | | | | | | |

Data of aspherical surface

First surface

K = 0.00000e+000 A 4 = 4.17866e−006 A 6 = −1.92010e−009
A 8 = 2.61505e−012 A10 = −1.54892e−015 A12 = 6.85390e−019

Sixteenth surface

K = 0.00000e+000 A 4 = −9.59888e−006 A 6 = 1.81600e−008
A 8 = −1.07471e−010 A10 = 2.56594e−013 A12 = −2.92447e−016

Seventeenth surface

K = 0.00000e+000 A 4 = −7.03453e−006 A 6 = 2.19484e−008
A 8 = −1.21795e−010 A10 = 3.13899e−013 A12 = −3.71003e−016

Various data
Zoom ratio 2.50

| | Wide angle | Middle | Telephoto |
|---|---|---|---|
| Focal length | 12.50 | 18.75 | 31.25 |
| F-number | 3.50 | 3.50 | 3.50 |
| Half angle of view | 51.21 | 39.67 | 26.45 |
| Height of image | 15.55 | 15.55 | 15.55 |
| Total lens length | 193.59 | 193.59 | 193.59 |
| BF | 42.84 | 42.84 | 42.84 |
| d12 | 28.20 | 18.14 | 10.94 |
| d17 | 1.65 | 17.73 | 40.53 |
| d20 | 23.30 | 17.28 | 1.68 |
| Position of entrance pupil | 27.36 | 29.48 | 32.93 |
| Position of exit pupil | −23.47 | −23.47 | −23.47 |
| Position of front principal point | 37.50 | 42.93 | 49.45 |
| Position of rear principal point | 30.34 | 24.09 | 11.59 |

-continued

| Unit mm |
| --- |
| Data of zoom lens unit |

| Unit | Leading surface | Focal length | Lens structure length | Position of front principal point | Position of rear principal point |
| --- | --- | --- | --- | --- | --- |
| 1 | 1 | −17.60 | 47.98 | 12.07 | −23.60 |
| 2 | 13 | 37.30 | 15.79 | 5.20 | −5.13 |
| 3 | 18 | −40.80 | 4.27 | 0.63 | −1.68 |
| 4 | 21 | 41.98 | 29.56 | 4.49 | −18.44 |

Numeric Embodiment 2

| Unit mm | | | | | | | |
| --- | --- | --- | --- | --- | --- | --- | --- |
| Surface number | r | d | nd | vd | θgF | Effective diameter | Focal length |
| 1* | 145.17014 | 3.00000 | 1.772499 | 49.60 | 0.5521 | 69.566 | −48.598 |
| 2 | 29.67131 | 20.27934 | | | | 51.793 | |
| 3 | −83.50875 | 2.00000 | 1.696797 | 55.53 | 0.5433 | 51.023 | −46.709 |
| 4 | 54.23801 | 0.20000 | | | | 49.760 | |
| 5 | 51.45567 | 6.07171 | 1.854780 | 24.80 | 0.6121 | 50.184 | 95.067 |
| 6 | 130.50000 | 2.99205 | | | | 49.753 | |
| 7 | 225.36754 | 7.87693 | 1.496999 | 81.54 | 0.5374 | 49.592 | 108.104 |
| 8 | −69.99417 | 0.15369 | | | | 49.343 | |
| 9 | −267.94137 | 2.00000 | 1.772499 | 49.60 | 0.5521 | 47.353 | −147.091 |
| 10 | 199.59718 | (Variable) | | | | 46.379 | |
| 11 | −154856.85999 | 5.13719 | 1.516330 | 64.14 | 0.5352 | 49.352 | 229.481 |
| 12 | −118.83885 | 0.20000 | | | | 50.068 | |
| 13 | 85.50323 | 12.83275 | 1.595220 | 67.74 | 0.5442 | 51.557 | 58.118 |
| 14 | −55.16316 | 2.00000 | 1.854780 | 24.80 | 0.6121 | 51.297 | −134.175 |
| 15 | −107.13276 | 0.20000 | | | | 51.619 | |
| 16* | 258.24126 | 5.32192 | 1.583126 | 59.38 | 0.5423 | 50.221 | 180.038 |
| 17* | −176.74761 | (Variable) | | | | 49.486 | |
| 18 | −72.43254 | 1.00000 | 1.651597 | 58.55 | 0.5426 | 26.470 | −67.149 |
| 19 | 112.26397 | 1.20000 | | | | 25.326 | |
| 20 | −148.48145 | 1.00000 | 1.834000 | 37.16 | 0.5775 | 25.356 | −38.301 |
| 21 | 41.15553 | 4.25211 | 1.805181 | 25.42 | 0.6161 | 24.723 | 42.579 |
| 22 | −207.22494 | (Variable) | | | | 24.370 | |
| 23 (Aperture stop) | ∞ | 2.29891 | | | | 23.173 | |
| 24 | 56.83698 | 3.99881 | 1.729157 | 54.68 | 0.5444 | 23.596 | 48.435 |
| 25 | −91.55085 | 1.20000 | 1.720467 | 34.70 | 0.5834 | 23.373 | −100.163 |
| 26 | 354.00250 | 17.77415 | | | | 23.134 | |
| 27 | 116.29624 | 1.20000 | 1.654115 | 39.70 | 0.5737 | 22.570 | −222.919 |
| 28 | 64.60211 | 3.60724 | 1.496999 | 81.54 | 0.5374 | 22.788 | 84.629 |
| 29 | −119.30244 | 6.75821 | | | | 23.161 | |
| 30 | 85.22775 | 6.17293 | 1.438750 | 94.93 | 0.5343 | 24.628 | 44.555 |
| 31 | −24.88647 | 0.38396 | | | | 24.695 | |
| 32 | −24.69675 | 1.20000 | 1.720467 | 34.70 | 0.5834 | 24.486 | −53.370 |
| 33 | −69.60366 | 43.27 | | | | 25.184 | |
| Image plane | ∞ | | | | | | |

| Data of aspherical surface |
| --- |
| First surface |

K = 0.00000e+000 A 4 = 2.50679e−006 A 6 = −7.99208e−010
A 8 = 4.81444e−013 A10 = −1.74689e−016 A12 = 3.59817e−020
Sixteenth surface K = 0.00000e+000 A 4 = −2.17519e−006 A 6 = 3.05858e−009
A 8 = −2.68615e−012 A10 = 2.33037e−015 A12 = 8.32786e−019
Seventeenth surface K = 0.00000e+000 A 4 = −1.97934e−006 A 6 = 3.49219e−009
A 8 = −3.16130e−012 A10 = 2.73213e−015 A12 = 7.64582e−019

-continued

| Unit mm | | | |
|---|---|---|---|
| Various data Zoom ratio 2.81 | | | |
|  | Wide angle | Middle | Telephoto |
| Focal length | 16.00 | 26.88 | 45.00 |
| F-number | 2.80 | 2.80 | 2.80 |
| Half angle of view | 44.18 | 30.05 | 19.06 |
| Height of image | 15.55 | 15.55 | 15.55 |
| Total lens length | 247.38 | 247.38 | 247.38 |
| BF | 43.27 | 43.27 | 43.27 |
| d10 | 40.43 | 22.58 | 13.00 |
| d17 | 2.46 | 31.99 | 66.12 |
| d22 | 38.90 | 27.22 | 2.67 |
| Position of entrance pupil | 33.77 | 41.26 | 51.29 |
| Position of exit pupil | −50.57 | −50.57 | −50.57 |
| Position of front principal point | 47.04 | 60.44 | 74.72 |
| Position of rear principal point | 27.27 | 16.39 | −1.73 |

| Data of zoom lens unit | | | | | |
|---|---|---|---|---|---|
| Unit | Leading surface | Focal length | Lens structure length | Position of front principal point | Position of rear principal point |
| 1 | 1 | −30.60 | 44.57 | 7.50 | −26.30 |
| 2 | 11 | 52.50 | 25.69 | 8.67 | −8.23 |
| 3 | 18 | −58.50 | 7.45 | −0.19 | −4.95 |
| 4 | 23 | 52.44 | 44.59 | 16.78 | −25.89 |

Numeric Embodiment 3

| Unit mm | | | | | | |
|---|---|---|---|---|---|---|
| Surface number | r | d | nd | vd | θgF | Effective diameter | Focal length |
| 1* | 98.81978 | 2.56500 | 1.772499 | 49.60 | 0.5521 | 65.783 | −42.607 |
| 2 | 24.49801 | 14.92817 | | | | 46.449 | |
| 3 | 53.43399 | 1.71000 | 1.696797 | 55.53 | 0.5433 | 41.674 | −43.396 |
| 4 | 19.10829 | 13.55157 | | | | 32.471 | |
| 5 | −52.94064 | 1.71000 | 1.696797 | 55.53 | 0.5433 | 31.164 | −31.297 |
| 6 | 37.85240 | 0.19983 | | | | 30.654 | |
| 7 | 34.72560 | 4.52580 | 1.854780 | 24.80 | 0.6121 | 30.989 | 57.683 |
| 8 | 107.91960 | 1.94919 | | | | 30.611 | |
| 9 | 55.04475 | 6.27760 | 1.487490 | 70.23 | 0.5300 | 30.280 | 56.804 |
| 10 | −54.00646 | 0.19202 | | | | 29.743 | |
| 11 | −635.45495 | 1.71000 | 1.834000 | 37.16 | 0.5775 | 28.174 | −66.863 |
| 12 | 61.63147 | (Variable) | | | | 27.299 | |
| 13 | 32.18839 | 10.47861 | 1.487490 | 70.23 | 0.5300 | 29.720 | 33.632 |
| 14 | −30.04932 | 1.20000 | 1.846660 | 23.78 | 0.6205 | 29.264 | −108.851 |
| 15 | −45.19363 | 0.20000 | | | | 29.519 | |
| 16* | 113.36465 | 4.94151 | 1.583126 | 59.38 | 0.5423 | 28.257 | 75.478 |
| 17* | −71.25404 | (Variable) | | | | 27.512 | |
| 18 | −66.26307 | 1.00000 | 1.882997 | 40.76 | 0.5667 | 17.157 | −18.045 |
| 19 | 21.28891 | 3.42625 | 1.808095 | 22.76 | 0.6307 | 17.030 | 32.119 |
| 20 | 104.96393 | (Variable) | | | | 17.020 | |
| 21(Aperture stop) | ∞ | 3.00972 | | | | 17.226 | |
| 22 | 23.82123 | 3.99006 | 1.589130 | 61.14 | 0.5406 | 17.814 | 35.019 |
| 23 | −148.75008 | 0.61888 | | | | 17.374 | |
| 24 | −55.41955 | 1.00000 | 2.000690 | 25.46 | 0.6133 | 17.291 | −16.972 |
| 25 | 25.04187 | 4.31536 | 1.922860 | 18.90 | 0.6495 | 17.145 | 17.872 |
| 26 | −45.94351 | 0.20000 | | | | 17.107 | |
| 27 | −59.27785 | 1.00000 | 1.800999 | 34.97 | 0.5863 | 16.946 | −21.035 |
| 28 | 23.94160 | 5.46854 | 1.496999 | 81.54 | 0.5374 | 16.670 | 25.565 |
| 29 | −25.17361 | 3.75678 | | | | 16.784 | |
| 30 | 56.21741 | 4.98165 | 1.496999 | 81.54 | 0.5374 | 17.430 | 28.175 |
| 31 | −18.16856 | 1.00000 | 1.854780 | 24.80 | 0.6121 | 17.657 | −32.009 |
| 32 | −54.44478 | 41.28 | | | | 18.411 | |
| Image plane | ∞ | | | | | | |

-continued

| Unit mm |
|---|

| Data of aspherical surface |
|---|

First surface

K = 0.00000e+000 A 4 = 8.06357e−006 A 6 = −7.33504e−009
A 8 = 9.49818e−012 A10 = −6.69349e−015 A12 = 2.48987e−018

Sixteenth surface

K = 0.00000e+000 A 4 = −1.73308e−005 A 6 = 3.37473e−008
A 8 = −2.63337e−010 A10 = 9.40008e−013 A12 = −9.53132e−016

Seventeenth surface

K = 0.00000e+000 A 4 = −1.03271e−005 A 6 = 4.81257e−008
A 8 = −3.14294e−010 A10 = 1.21513e−012 A12 = −1.47785e−015

Various data
Zoom ratio 2.00

|  | Wide angle | Middle | Telephoto |
|---|---|---|---|
| Focal length | 10.50 | 15.23 | 21.00 |
| F-number | 3.00 | 3.00 | 3.00 |
| Half angle of view | 55.97 | 45.61 | 36.52 |
| Height of image | 15.55 | 15.55 | 15.55 |
| Total lens length | 177.73 | 177.73 | 177.73 |
| BF | 41.28 | 41.28 | 41.28 |
| d12 | 16.97 | 10.07 | 6.06 |
| d17 | 1.17 | 14.83 | 28.49 |
| d20 | 18.40 | 11.64 | 1.98 |
| Position of entrance pupil | 22.99 | 24.27 | 25.54 |
| Position of exit pupil | −25.69 | −25.69 | −25.69 |
| Position of front principal point | 31.84 | 36.04 | 39.95 |
| Position of rear principal point | 30.78 | 26.06 | 20.28 |

Data of zoom lens unit

| Unit | Leading surface | Focal length | Lens structure length | Position of front principal point | Position of rear principal point |
|---|---|---|---|---|---|
| 1 | 1 | −12.20 | 49.32 | 11.96 | −22.67 |
| 2 | 13 | 30.90 | 16.82 | 5.87 | −6.00 |
| 3 | 18 | −40.20 | 4.43 | 0.83 | −1.56 |
| 4 | 21 | 40.17 | 29.34 | 9.89 | −12.56 |

Numeric Embodiment 4

| Unit mm | | | | | | | |
|---|---|---|---|---|---|---|---|
| Surface number | r | d | nd | vd | θgF | Effective diameter | Focal length |
| 1* | 166.07091 | 3.50000 | 1.772499 | 49.60 | 0.5521 | 69.122 | −38.336 |
| 2 | 25.00244 | 15.65668 | | | | 47.006 | |
| 3 | 58.38991 | 2.00000 | 1.696797 | 55.53 | 0.5433 | 40.443 | −44.473 |
| 4 | 20.01482 | 10.42841 | | | | 31.410 | |
| 5* | 296.67411 | 1.40000 | 1.583126 | 59.38 | 0.5423 | 27.667 | −58.414 |
| 6* | 30.61118 | 7.08107 | | | | 24.330 | |
| 7 | −54.28971 | 1.20000 | 1.438750 | 94.93 | 0.5343 | 23.760 | −56.039 |
| 8 | 45.45125 | 0.19986 | | | | 23.631 | |
| 9 | 28.65621 | 3.38892 | 1.846660 | 23.78 | 0.6034 | 24.570 | 65.669 |
| 10 | 55.33305 | 1.98071 | | | | 24.341 | |
| 11 | 52.98182 | 5.27110 | 1.516330 | 64.14 | 0.5352 | 24.700 | 46.573 |
| 12 | −42.82707 | 0.19776 | | | | 24.596 | |
| 13 | −183.85075 | 1.20000 | 1.834000 | 37.16 | 0.5775 | 23.936 | −50.553 |
| 14 | 55.32533 | (Variable) | | | | 23.486 | |
| 15 | 24.01800 | 9.15521 | 1.516330 | 64.14 | 0.5352 | 24.055 | 25.293 |
| 16 | −25.10305 | 1.20000 | 1.805181 | 25.42 | 0.6161 | 23.001 | −66.702 |
| 17 | −47.75887 | 0.20000 | | | | 22.740 | |
| 18* | 368.86885 | 3.59632 | 1.583126 | 59.38 | 0.5423 | 21.560 | 69.679 |
| 19* | −45.70235 | (Variable) | | | | 20.283 | |
| 20 | −66.25563 | 1.00000 | 1.882997 | 40.76 | 0.5667 | 15.089 | −12.655 |
| 21 | 13.63110 | 4.03194 | 1.854780 | 24.80 | 0.6121 | 14.854 | 16.947 |
| 22 | 173.27617 | (Variable) | | | | 14.758 | |

-continued

| | | Unit mm | | | | | |
|---|---|---|---|---|---|---|---|
| 23 (Aperture stop) | ∞ | 1.49724 | | | | 14.694 | |
| 24 | 53.54771 | 3.97931 | 1.589130 | 61.14 | 0.5406 | 14.661 | 25.771 |
| 25 | −20.71801 | 1.00000 | 1.910820 | 35.25 | 0.5824 | 14.416 | −13.379 |
| 26 | 30.77153 | 0.20000 | | | | 14.522 | |
| 27 | 20.36752 | 4.18435 | 1.805181 | 25.42 | 0.6161 | 14.930 | 18.942 |
| 28 | −57.21607 | 0.20000 | | | | 14.753 | |
| 29 | −464.62521 | 1.00000 | 1.800999 | 34.97 | 0.5863 | 14.529 | −15.992 |
| 30 | 13.27762 | 5.05220 | 1.496999 | 81.54 | 0.5374 | 13.971 | 20.128 |
| 31 | −35.86192 | 1.25710 | | | | 14.872 | |
| 32 | −162.01537 | 5.13891 | 1.487490 | 70.23 | 0.5300 | 15.904 | 26.357 |
| 33 | −12.06668 | 1.00000 | 1.854780 | 24.80 | 0.6121 | 16.701 | −45.881 |
| 34 | −18.02300 | 37.98 | | | | 17.999 | |
| Image plane | ∞ | | | | | | |

Data of aspherical surface

First surface $K = 0.00000e+000$ $A4 = 1.16496e-005$ $A6 = -1.37512e-008$
$A8 = 1.55219e-011$ $A10 = -9.48947e-015$ $A12 = 2.72161e-018$ Fifth surface $K = 0.00000e+000$ $A4 = 1.23089e-006$ $A6 = 1.58453e-007$
$A8 = -2.93819e-010$ $A10 = -9.70645e-013$ $A12 = 3.14980e-015$ Sixth surface $K = 0.00000e+000$ $A4 = 3.33504e-005$ $A6 = 6.65742e-008$
$A8 = 1.30829e-009$ $A10 = -7.64884e-012$ $A12 = 1.58200e-014$ Eighteenth surface $K = 0.00000e+000$ $A4 = -1.12452e-005$ $A6 = 1.46196e-007$
$A8 = -2.42732e-010$ $A10 = 6.73558e-012$ $A12 = -1.33966e-014$ Nineteenth surface $K = 0.00000e+000$ $A4 = 8.37535e-006$ $A6 = 1.64809e-007$
$A8 = -7.11266e-012$ $A10 = 4.39885e-012$ $A12 = 5.34610e-015$ Various data
Zoom ratio 1.50

| | Wide angle | Middle | Telephoto |
|---|---|---|---|
| Focal length | 9.00 | 11.70 | 13.50 |
| F-number | 2.90 | 2.90 | 2.90 |
| Half angle of view | 59.94 | 53.04 | 49.04 |
| Height of image | 15.55 | 15.55 | 15.55 |
| Total lens length | 156.79 | 156.79 | 156.79 |
| BF | 37.98 | 37.98 | 37.98 |
| d14 | 15.27 | 8.79 | 5.86 |
| d19 | 1.14 | 8.83 | 14.09 |
| d22 | 5.20 | 4.00 | 1.67 |
| Position of entrance pupil | 21.61 | 22.08 | 22.44 |
| Position of exit pupil | −25.28 | −25.28 | −25.28 |
| Position of front principal point | 29.33 | 31.62 | 33.06 |
| Position of rear principal point | 28.98 | 26.28 | 24.48 |

Data of zoom lens unit

| Unit | Leading surface | Focal length | Lens structure length | Position of front principal point | Position of rear principal point |
|---|---|---|---|---|---|
| 1 | 1 | −10.00 | 53.50 | 12.83 | −24.67 |
| 2 | 15 | 26.60 | 14.15 | 4.55 | −5.45 |
| 3 | 20 | −48.90 | 5.03 | 0.70 | −1.96 |
| 4 | 23 | 43.94 | 24.51 | 15.06 | −2.36 |

Numeric Embodiment 5

| Unit mm | | | | | | | |
|---|---|---|---|---|---|---|---|
| Surface number | r | d | nd | νd | θgF | Effective diameter | Focal length |
| 1* | 122.98756 | 3.00000 | 1.696797 | 55.53 | 0.5433 | 77.200 | −73.457 |
| 2 | 35.88815 | 28.76364 | | | | 60.474 | |
| 3 | −983.76737 | 2.00000 | 1.516330 | 64.14 | 0.5352 | 50.478 | −197.692 |
| 4 | 114.44384 | 4.80848 | | | | 48.005 | |
| 5 | −140.00941 | 2.00000 | 1.589130 | 61.14 | 0.5406 | 47.896 | −77.264 |
| 6 | 68.19706 | 0.05717 | | | | 46.285 | |
| 7 | 61.35970 | 5.48450 | 1.805181 | 25.42 | 0.6161 | 46.774 | 141.043 |
| 8 | 126.76209 | (Variable) | | | | 46.835 | |
| 9 | 133.52188 | 9.39853 | 1.496999 | 81.54 | 0.5374 | 52.915 | 114.547 |
| 10 | −97.41700 | 0.17467 | | | | 53.201 | |
| 11 | 74.19099 | 13.22655 | 1.438750 | 94.93 | 0.5343 | 51.969 | 80.376 |
| 12 | −63.85836 | 2.00000 | 1.854780 | 24.80 | 0.6121 | 50.923 | −143.472 |
| 13 | −133.80088 | 0.20000 | | | | 51.078 | |
| 14* | 218.51676 | 6.75488 | 1.583126 | 59.38 | 0.5423 | 50.216 | 118.781 |
| 15* | −100.84106 | (Variable) | | | | 50.008 | |
| 16* | −38.76564 | 1.00000 | 1.583126 | 59.38 | 0.5423 | 21.866 | −41.169 |
| 17 | 64.33231 | 2.50000 | | | | 20.633 | |
| 18 | −42.23901 | 1.00000 | 1.882997 | 40.76 | 0.5667 | 20.471 | −37.021 |
| 19 | 150.05360 | 3.78925 | 1.755199 | 27.51 | 0.6103 | 20.561 | 39.199 |
| 20 | −36.86642 | (Variable) | | | | 20.653 | |
| 21(Aperture stop) | ∞ | 1.97983 | | | | 18.180 | |
| 22 | 56.18245 | 5.18489 | 1.487490 | 70.23 | 0.5300 | 18.521 | 34.494 |
| 23 | −23.38333 | 1.20000 | 1.548141 | 45.79 | 0.5685 | 18.454 | −60.106 |
| 24 | −81.00659 | 25.19314 | | | | 18.475 | |
| 25 | 68.40261 | 4.42842 | 1.496999 | 81.54 | 0.5374 | 21.928 | 137.314 |
| 26 | 108773.02770 | 6.75821 | | | | 22.270 | |
| 27 | 195.13284 | 5.14940 | 1.496999 | 81.54 | 0.5374 | 23.300 | 54.459 |
| 28 | −31.25500 | 2.11614 | | | | 23.443 | |
| 29 | −28.62267 | 1.20000 | 1.903660 | 31.32 | 0.5946 | 22.763 | −56.735 |
| 30 | −65.47272 | 45.03 | | | | 23.371 | |
| Image plane | ∞ | | | | | | |

Data of aspherical surface

First surface

K = 0.00000e+000 A 4 = 1.19748e−006 A 6 = −1.01092e−010
A 8 = 2.64659e−014 A10 = 2.61525e−017 A12 = −4.38423e−021

Fourteenth surface

K = 0.00000e+000 A 4 = −2.04406e−006 A 6 = 1.89826e−009
A 8 = −4.25645e−012 A10 = 3.33347e−015 A12 = −1.72266e−018

Fifteenth surface

K = 0.00000e+000 A 4 = −1.30309e−006 A 6 = 2.29967e−009
A 8 = −4.87658e−012 A10 = 4.07050e−015 A12 = −1.88237e−018

Sixteenth surface

K = 0.00000e+000 A 4 = 4.51838e−006 A 6 = 9.87511e−009
A 8 = −1.68427e−010 A10 = 1.18905e−012 A12 = −3.25353e−015

Various data
Zoom ratio 4.00

| | Wide angle | Middle | Telephoto |
|---|---|---|---|
| Focal length | 18.00 | 36.00 | 72.00 |
| F-number | 4.00 | 4.00 | 4.00 |
| Half angle of view | 40.82 | 23.36 | 12.19 |
| Height of image | 15.55 | 15.55 | 15.55 |
| Total lens length | 265.17 | 265.17 | 265.17 |
| BF | 45.03 | 45.03 | 45.03 |
| d 8 | 38.04 | 16.77 | 7.02 |
| d15 | 2.43 | 35.62 | 72.78 |
| d20 | 40.30 | 28.38 | 0.98 |
| Position of entrance pupil | 43.57 | 59.32 | 83.92 |
| Position of exit pupil | −57.20 | −57.20 | −57.20 |
| Position of front principal point | 58.40 | 82.64 | 105.21 |
| Position of rear principal point | 27.03 | 9.03 | −26.97 |

-continued

| Unit mm |
|---|
| Data of zoom lens unit |

| Unit | Leading surface | Focal length | Lens structure length | Position of front principal point | Position of rear principal point |
|---|---|---|---|---|---|
| 1 | 1 | −33.10 | 46.11 | 15.22 | −19.75 |
| 2 | 9 | 47.78 | 31.75 | 11.21 | −11.52 |
| 3 | 16 | −43.53 | 8.29 | −2.15 | −8.60 |
| 4 | 21 | 53.63 | 53.21 | 15.77 | −34.87 |

Numeric Embodiment 6

| Unit mm | | | | | | | |
|---|---|---|---|---|---|---|---|
| Surface number | r | d | nd | vd | θgF | Effective diameter | Focal length |
| 1* | 76.00463 | 3.50000 | 1.772499 | 49.60 | 0.5521 | 72.084 | −60.643 |
| 2 | 28.48353 | 22.08135 | | | | 53.240 | |
| 3 | −205.17955 | 2.50000 | 1.651597 | 58.55 | 0.5426 | 51.048 | −57.709 |
| 4 | 46.49354 | 2.75498 | | | | 46.595 | |
| 5 | 44.98637 | 4.94085 | 1.654115 | 39.70 | 0.5737 | 46.855 | 154.287 |
| 6 | 77.25988 | 13.54376 | | | | 46.073 | |
| 7 | 176.88727 | 4.75286 | 1.717362 | 29.50 | 0.6048 | 44.481 | 125.299 |
| 8 | −183.64728 | 3.80595 | | | | 43.815 | |
| 9 | −78.45720 | 2.50000 | 1.589130 | 61.14 | 0.5406 | 42.017 | −103.570 |
| 10 | 282.67057 | (Variable) | | | | 40.737 | |
| 11 | 122.74585 | 6.17776 | 1.595220 | 67.74 | 0.5442 | 41.860 | 118.593 |
| 12 | −164.35557 | 0.20000 | | | | 42.143 | |
| 13 | −916.62183 | 2.00000 | 1.805181 | 25.42 | 0.6161 | 42.138 | −85.989 |
| 14 | 75.71908 | 7.69391 | 1.496999 | 81.54 | 0.5374 | 42.233 | 90.284 |
| 15 | −107.18472 | 0.20000 | | | | 42.605 | |
| 16* | 72.03817 | 8.00176 | 1.583126 | 59.38 | 0.5423 | 42.698 | 73.109 |
| 17* | −101.14319 | (Variable) | | | | 42.196 | |
| 18 | −58.31172 | 1.00000 | 1.589130 | 61.14 | 0.5406 | 25.054 | −58.774 |
| 19 | 86.61403 | 2.00000 | | | | 24.984 | |
| 20 | −124.67051 | 1.00000 | 1.834000 | 37.16 | 0.5775 | 25.048 | −39.497 |
| 21 | 45.32366 | 4.37210 | 1.854780 | 24.80 | 0.6121 | 25.632 | 42.127 |
| 22 | −175.42974 | (Variable) | | | | 25.954 | |
| 23(Aperture stop) | ∞ | 0.98743 | | | | 26.356 | |
| 24 | 46.68453 | 4.11669 | 1.696797 | 55.53 | 0.5433 | 26.847 | 62.101 |
| 25 | −605.86282 | 11.14904 | | | | 26.548 | |
| 26 | 108.99092 | 1.20000 | 1.654115 | 39.70 | 0.5737 | 23.120 | −46.536 |
| 27 | 23.80112 | 5.38307 | 1.496999 | 81.54 | 0.5374 | 22.256 | 39.031 |
| 28 | −98.53064 | 6.75821 | | | | 21.901 | |
| 29 | 73.61813 | 5.17741 | 1.438750 | 94.93 | 0.5343 | 22.174 | 46.241 |
| 30 | −27.50019 | 1.20000 | 1.720467 | 34.70 | 0.5834 | 22.221 | −48.360 |
| 31 | −129.61057 | (Variable) | | | | 22.720 | |
| Image plane | ∞ | | | | | | |

| Data of aspherical surface |
|---|
| First surface |

K = 0.00000e+000 A 4 = 1.93169e−006 A 6 = −2.07535e−010
A 8 = 5.80702e−013 A10 = −3.53624e−016 A12 = 1.73149e−019
Sixteenth surface K = 0.00000e+000 A 4 = −1.58493e−006 A 6 = 4.93078e−009
A 8 = −1.62831e−011 A10 = 2.94648e−014 A12 = −2.40387e−017
Seventeenth surface K = 0.00000e+000 A 4 = −8.21603e−007 A 6 = 5.37705e−009
A 8 = −1.82082e−011 A10 = 3.38552e−014 A12 = −2.74747e−017

| Various data Zoom ratio 2.62 | | | |
|---|---|---|---|
| | Wide angle | Middle | Telephoto |
| Focal length | 16.00 | 28.00 | 42.00 |
| F-number | 2.60 | 2.60 | 2.60 |

-continued

| Unit mm | | | |
|---|---|---|---|
| Half angle of view | 44.18 | 29.05 | 20.32 |
| Height of image | 15.55 | 15.55 | 15.55 |
| Total lens length | 231.09 | 231.09 | 231.09 |
| BF | 39.99 | 41.02 | 43.98 |
| d10 | 29.37 | 9.57 | 1.99 |
| d17 | 2.73 | 31.58 | 54.18 |
| d22 | 30.00 | 19.92 | 1.94 |
| d31 | 39.99 | 41.02 | 43.98 |
| Position of entrance pupil | 37.41 | 44.27 | 49.54 |
| Position of exit pupil | −31.85 | −31.85 | −31.85 |
| Position of front principal point | 49.84 | 61.51 | 68.28 |
| Position of rear principal point | 23.99 | 13.02 | 1.99 |

| Data of zoom lens unit | | | | | |
|---|---|---|---|---|---|
| Unit | Leading surface | Focal length | Lens structure length | Position of front principal point | Position of rear principal point |
| 1 | 1 | −28.00 | 60.38 | 13.73 | −31.93 |
| 2 | 11 | 48.20 | 24.27 | 10.10 | −6.16 |
| 3 | 18 | −55.50 | 8.37 | −0.39 | −6.02 |
| 4 | 23 | 49.26 | 35.97 | 5.86 | −25.20 |

TABLE 1

| | | Numeric Embodiment | | | | | |
|---|---|---|---|---|---|---|---|
| | Conditional expression | 1 | 2 | 3 | 4 | 5 | 6 |
| (1) | f1/f2 | −0.472 | −0.583 | −0.395 | −0.376 | −0.693 | −0.581 |
| (2) | f2/f3 | −0.914 | −0.897 | −0.769 | −0.544 | −1.098 | −0.868 |
| (3) | |m2/m3| | 0.799 | 0.757 | 0.664 | 2.667 | 0.789 | 1.138 |
| (4) | |f11/f12| | 0.068 | 0.070 | 0.040 | 0.025 | — | 0.040 |
| (5) | (θ1p − θ1n)/(ν1p − ν1n) | −2.29E−03 | −2.32E−03 | −2.29E−03 | −1.47E−03 | −2.19E−03 | −1.83E−03 |
| (6) | (θ2p − θ2n)/(ν2p − ν2n) | −1.99E−03 | −1.84E−03 | −2.06E−03 | −2.13E−03 | −1.38E−03 | −1.69E−03 |
| | m2 | −17.265 | −27.425 | −10.905 | −9.416 | −31.024 | −27.383 |
| | m3 | 21.618 | 36.233 | 16.415 | 3.530 | 39.324 | 24.061 |
| | f11 | −15.434 | −27.161 | −11.451 | −9.589 | — | −31.728 |
| | f12 | 225.346 | 387.441 | 287.190 | 376.094 | — | −802.576 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-164807, filed Aug. 8, 2013, which is hereby incorporated by reference herein in its entirety.

What is claimed is:

1. A zoom lens comprising, in order from an object side to an image side:
   a first lens unit having a negative refractive power which does not move for zooming;
   a second lens unit having a positive refractive power which moves during the zooming;
   a third lens unit having a negative refractive power which moves during the zooming; and
   a fourth lens unit having a positive refractive power,
   wherein the following expressions are satisfied:

$-0.80 < f1/f2 < -0.25$, $-1.2 < f2/f3 < -0.4$, and $0.5 < |m2/m3| < 3.0$, where f1 represents a focal length of the first lens unit, f2 represents a focal length of the second lens unit, f3 represents a focal length of the third lens unit, m2 represents a moving amount of the second lens unit during the zooming from a wide angle end to a telephoto end, and m3 represents a moving amount of the third lens unit during the zooming from the wide angle end to the telephoto end.

2. The zoom lens according to claim 1,
   wherein the first lens unit comprises a first sub lens unit having a negative refractive power which does not move for focusing, and a second sub lens unit which moves during the focusing; and
   wherein the following conditional expression is satisfied:

$0.005 < |f11/f12| < 0.150$, where f11 represents a focal length of the first sub lens unit and f12 represents a focal length of the second sub lens unit.

3. The zoom lens according to claim 1, wherein the fourth lens unit or a lens unit of a part of the fourth lens unit is moved during the focusing.

4. The zoom lens according to claim 1, wherein a front sub lens unit which does not move for the focusing out of lenses that constitute the first lens unit comprises one or more convex lenses and two or more concave lenses, with a lens closest to the object side in the front sub lens unit being a concave lens, with a lens closest to the image side in the front sub lens unit being a convex lens.

5. The zoom lens according to claim 4, wherein the following conditional expression is satisfied, $-2.50 \times 10^{-3} < (\theta 1p - \theta 1n)/(\nu 1p - \nu 1n) < -1.30 \times 10^{-3}$, where ν1p and θ1p represent average values of an Abbe number and a partial dispersion ratio of the convex lenses which constitute the front sub lens unit respectively, and ν1n and θ1n represent average values of an Abbe number and a partial dispersion ratio of the concave lenses, respectively, and where an Abbe number ν and a partial dispersion ratio θ are respectively expressed by $$\nu = (Nd-1)/(NF-NC),$$

$$\theta = (Ng-NF)/(NF-NC),$$

where Ng represents a refractive index in a g-line, NF represents a refractive index in an F-line, Nd represents a refractive index in a d-line, and NC represents a refractive index in a C-line.

6. The zoom lens according to claim 1,
wherein the second lens unit comprises two or more convex lenses and one or more concave lenses, and
wherein the following conditional expression is satisfied, $$-2.30\times10^{-3} < (\theta 2p - \theta 2n)/(\nu 2p - \nu 2n) < -1.20\times10^{-3},$$

where ν2p and θ2p represent average values of an Abbe number and a partial dispersion ratio of the convex lenses which constitute the second lens unit, respectively, and ν2n and θ2n represent average values of an Abbe number and a partial dispersion ratio of the concave lenses, respectively.

7. The zoom lens according to claim 1, wherein the second lens unit includes a lens having an aspherical surface on at least one surface.

8. An image pickup apparatus comprising:
a zoom lens comprising, in order from an object side to an image side:
a first lens unit having a negative refractive power which does not move for zooming;
a second lens unit having a positive refractive power which moves during the zooming;
a third lens unit having a negative refractive power which moves during the zooming; and
a fourth lens unit having a positive refractive power,
wherein the following expressions are satisfied:

$$-0.80 < f1/f2 < -0.25,$$

$$-1.2 < f2/f3 < -0.4, \text{ and}$$

$$0.5 < |m2/m3| < 3.0,$$

where f1 represents a focal length of the first lens unit, f2 represents a focal length of the second lens unit, f3 represents a focal length of the third lens unit, m2 represents a moving amount of the second lens unit during the zooming from a wide angle end to a telephoto end, and m3 represents a moving amount of the third lens unit during the zooming from the wide angle end to the telephoto end; and
an image pickup element which photoelectrically converts an optical image formed by the zoom lens.

* * * * *